US000001033H

United States Statutory Invention Registration [19]

[11] Reg. Number: H1033

Willey et al.

[43] Published: Mar. 3, 1992

[54] ANTI-JAMMING SYSTEM FOR TRACKING AND SURVEILLANCE RADAR

[75] Inventors: Jefferson M. Willey, Columbia, Md.; James P. Hansen, Fairfax; Edward E. Maine, Jr., Woodbridge, both of Va.

[73] Assignee: United States of America, Washington, D.C.

[21] Appl. No.: 636,472

[22] Filed: Dec. 31, 1990

[51] Int. Cl.[5] ..... G01S 7/36

[52] U.S. Cl. ..... 342/17; 342/16; 342/378; 342/383; 342/384

*Primary Examiner*—Bermarr E. Gregory
*Attorney, Agent, or Firm*—Thomas E. McDonnell; Edward F. Miles

[57] ABSTRACT

A radar ECCM system for degrading the effect that a standoff noise jammer has on a radar receiving site that is tracking an incoming aerial target. The system effectively removes from the mainlobe of the beam emanating from the site the component of random noise contained in the jamming signal.

4 Claims, 27 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ANTI-JAMMING SYSTEM FOR TRACKING AND SURVEILLANCE RADAR

BACKGROUND OF THE INVENTION

1. Field of the Invention

This invention relates to a system for tracking and surveillance radars which are susceptible to mainlobe jamming. In particular, the invention discloses a standoff jamming ECCM technique that removes a random noise source in the mainlobe of the radar beam. The noise source is anticipated to be random in phase and/or polarization.

2. Discussion of the Prior Art

Devices have been known in the past that improve the resistance of tracking and surveillance radars to mainlobe jamming. One such method employs a dual radar which measures the signal level and phase of two orthogonally polarized channels to determine the receive polarization of the noise source. A polarization control network including RF/IF hybrids and electronic phase shifters attached to a dual polarized antenna is employed to change the receive polarization to be orthogonal to the noise polarization. The significant drawback of this method is its inability to isolate and measure the noise vector alone. Thus, the objectionable possibility exists of having the desired target signal contribute to the estimate of the noise vector. An additional disadvantage of this method is that the target vector may have the same direction sense as the noise vector, which results in the removal of the desired signal. Yet another significant limitation of this method is that the time-constant of the polarization control network (PCN) is typically orders of magnitude greater than the sample rate of the radar. Thus, a polarization agile noise source, whose bandwidth is greater than the equivalent bandwidth of the PCN control system, will not be removed.

Another method of reducing the susceptibility to mainlobe jamming involves the direct application of side-lobe canceller technique to dual polarized radar. This approach typically uses open loop cancellers to adaptively form a weight to remove the correlated signals between two orthogonally polarized receive channels. Some of the advantages of this approach over the first method described above include first, the cancellation ratio is a function of the dynamic range in the signal processor used to form the weights, and second, the equivalent time width of the sample window used to average the weights is smaller than the typical time constant of the PCN discussed hereinabove in connection with the first prior art method. However, the sample window width used to calculate the correlated signal component is still many samples at the radar's instantaneous bandwidth. Thus, a polarization agile noise source whose instantaneous bandwidth approaches that of the victim radar would require a sample window width of unity. In such a case, complete cancellation of target and noise signals will occur.

A third method which has been considered depends upon the application of main-lobe notchers. The implementation of a system described by this third method is essentially similar to the well known side-lobe canceller method. The main-lobe notcher is used to cancel high duty cycle interference which enters the radar's mainlobe from a single direction in space. The drawback with this method is that the target signal must be at a different angle from the null in order to be detected.

A fourth method known to applicants for coping with the problems of main-lobe jamming relies on the modification of a technique sometimes called "main-lobe noise cancellation". FIG. 1 schematically illustrates a prior art system for noise cancellation in the main lobe in accordance with this technique. Referring to the drawing, reference numeral 13 denotes a fixed time delay, 18 mixers, 20 IF amplifiers, 22 a local oscillator, 24 variable time delays, and 26 and 28 cancellers. This approach is essentially a radar ECCM technique that degrades the effectiveness of main-lobe jamming by using two or more physically separated radar receiving sites. For example, where an attack aircraft 10 is protected by a nearby jammer, the radar transmits only with a primary antenna 12 and receives reflections on the primary antenna 12 and two spaced auxiliary antennas 14 and 16. By properly delaying the individual signals which enter the auxiliary antennas, these signals can be correlated and used to cancel the noise signal. In order for the target signal not also to be cancelled, this spinoff of the ECCM technique relies on the fact that the radar returns from a complex geometrically shaped moving target will be different and partially non-correlated at the locations of the two auxiliary antennas 14 and 16 as compared to the principal antenna 12 due to the bistatic angle 12-10-14 and 12-10-16 as shown in FIG. 1. When the noise and target signals are applied to the cancellers 26 and 28 only the partial non-correlated target signal component will pass through. While successful to some degree, this method suffers from the disadvantages that the cancellation ratio is dependent on the target scattering matrix to return non-correlated signals; it will fail to detect a target when the polarization agile noise source's instantaneous bandwidth approaches the radar's instantaneous bandwidth; and it results in the need to continually determine the relative time delays of the individual noise signals in order to achieve cancellation.

A conventional radar jammer is in the form of a platform (e.g. a plane or a warship) associated with target platforms (e.g. airplanes or missiles) which the jammer seeks to protect from detection by hostile radars. In response to a hostile radar, the jammer sends out a signal larger compared to the radar echo the target platform would return, and of sufficient duration to ensure that the jammer signal covers the target echo. In short, the jammer buries the target echo both in time and magnitude.

A countermeasure to such a jammer is to detect and estimate the jamming signal, and calculate signal weights to cancel out the jamming signal. However, this does not preserve information about the signal's polorization. Modern radars also use the polarization of radar echoes to gain additional knowledge of the target, such as geometry and composition. A jamming signal that periodically changes its polarization, or, for that matter, a fixed polarization noise jammer, will defeat any countermeasure that did not adapt to the changing jammer polarization. Accordingly, any countermeasure to such a jammer would be most welcome.

SUMMARY OF THE INVENTION

Accordingly, in its broadest form, the invention is a radar system for detecting a target located in the vicinity of a jammer, whose jamming signal is much larger than the echo from the target, and which periodically changes its polarization (or, for that matter, a single polarization noise jammer). In response to an interrogating signal from the radar system, a return signal returns to the system comprised of an echo T from the target plus a jamming signal J. The system has a pair of antennas which each receives the return signal, and which together form a baseline transverse to the direction in which J and T propagate. (One of the antennas could also produce the interrogation signal.) Each antenna detects the return signal, and the system performs a series of cross-correlations of these detections to determine the time delay $\tau$ which maximizes the cross-correlation function. As long as the sources of J and T are separated in space and not collinear with either antenna, the version of the return signal detected at each antenna will not be identical, but rather J and T will have slightly different relative phases at each antenna resulting from slightly different propagation times to each. (To prevent such a collinear alignment from degrading the system, one can add a third antenna, which is not collinear with the baseline formed by the other two.) Because J is much larger than T, J will dominate the cross-correlations, and the value calculated for $\tau$ will be determined by the J component, virtually independent of T. The value of $\tau$, then, represents the time difference between arrival of the return signal at each antenna.

The system further measures J using conventional weighting techniques to calculate cancellation weights for J. In doing this, the system detects the return signal at several different ranges (in different range cells), resolves each detected return signal into two channels having orthogonal (or at least transverse) polarization states, coherently sums in each channel the signals from all the ranges, and averages the sum in each channel. (Coherent summing means adding the detected signals in phase: the detected signals are brought into the same phase by correcting for different propagation times to different range cells.) Because they relative phase of J and T varies from range cell to range cell, the T components in the measured signals will not add coherently, and the magnitude of the coherently added J components will come to dominate the sum. The sum in each channel depends only on signal J, and will be independent of signal T as a practical matter. The cancellation weights calculated based on these coherent sums are therefore the weights needed to cancel the noise signal J in each channel.

The data used to calculate the correction weights could be collected by the two antennas alone in response to only one return, particularly so if J's magnitude is so much greater than T's that the effect of non-coherently added T components would approach zero after only two sums. Alternately, the system could use a plurality of additional antennas in different range cells to take a larger number of data, again responsive to one return. If, however, the target moves with respect to the jammer, one antenna could be used to detect a sequence of return signals because the relative motion ensures that the relative phase of J and T in several return signals would constantly change, so that both J and T could never sum coherently.

The system then can take a return signal detected at either antenna, use $\tau$ to align the response and the cancellation signals in time, resolve the return signal into two component signals with the same polarization states as the cancellation signals, and subtract from each component signal the cancellation signal of like polarization state. The result of the subtractions is a pair of signals corresponding to T resolved into these orthogonal polarization states.

Thus the system is capable of detecting target signal T, including T's polarization state. Because the cancellation weights for J depend on the polarization of J, and the system can update these weights periodically, the system can adapt to J being polarization agile.

The ECCM technique of the present invention results in the removal of the stand-off random noise jamming signal which is present in the victim radar's main-lobe. When the noise source is randomly polarized, the technique of the present invention requires a dual polarized radar, two auxiliary receive only dual polarized antennas, and appropriate signal processing means for removing the noise components. The invention is described as using a polarized agile noise source. On transmit, the main antenna transmits a short pulse whose period (T) is proportional to the reciprocal of the radar bandwidth. On receive, the main and auxiliary antennas sample the spatial electromagnetic vector at greater than twice the IF frequency to preserve the phase and magnitude on each polarization channel. Letting the time sequence of vectors measured at the main antenna be considered to represent a code sequence, M(t), if the main and auxiliary antennas are sufficiently separated, a time displaced code sequence also enters the auxiliary antennas as $A_1(t)$, and $A_2(t)$. The main and auxiliary code sequences are cross-correlated to find the time displacement mT, after which the auxiliary code sequence is delayed by mT, and the main and delayed auxiliary sequences are then applied to a canceller to remove the correlated noise component.

Accordingly, an object of this invention is to provide ECCM apparatus which removes the random noise source in the main lobe of the radar system of concern.

Another object of the invention is to measure the noise vector alone present in the main-lobe of the radar of concern.

Still a further object of the invention is an ECCM technique in which the cancellation ratio is not dependent on the target scattering matrix to return non-correlated signals.

Other objects of the invention will become apparent from the following detailed description of the embodiment of the present invention when taken in conjunction with the accompanying drawings.

BRIEF DESCRIPTION OF THE DRAWINGS

The same reference characters refer to the same elements throughout the several embodiments of the invention.

DESCRIPTION OF PREFERRED EMBODIMENT

Figure 1:
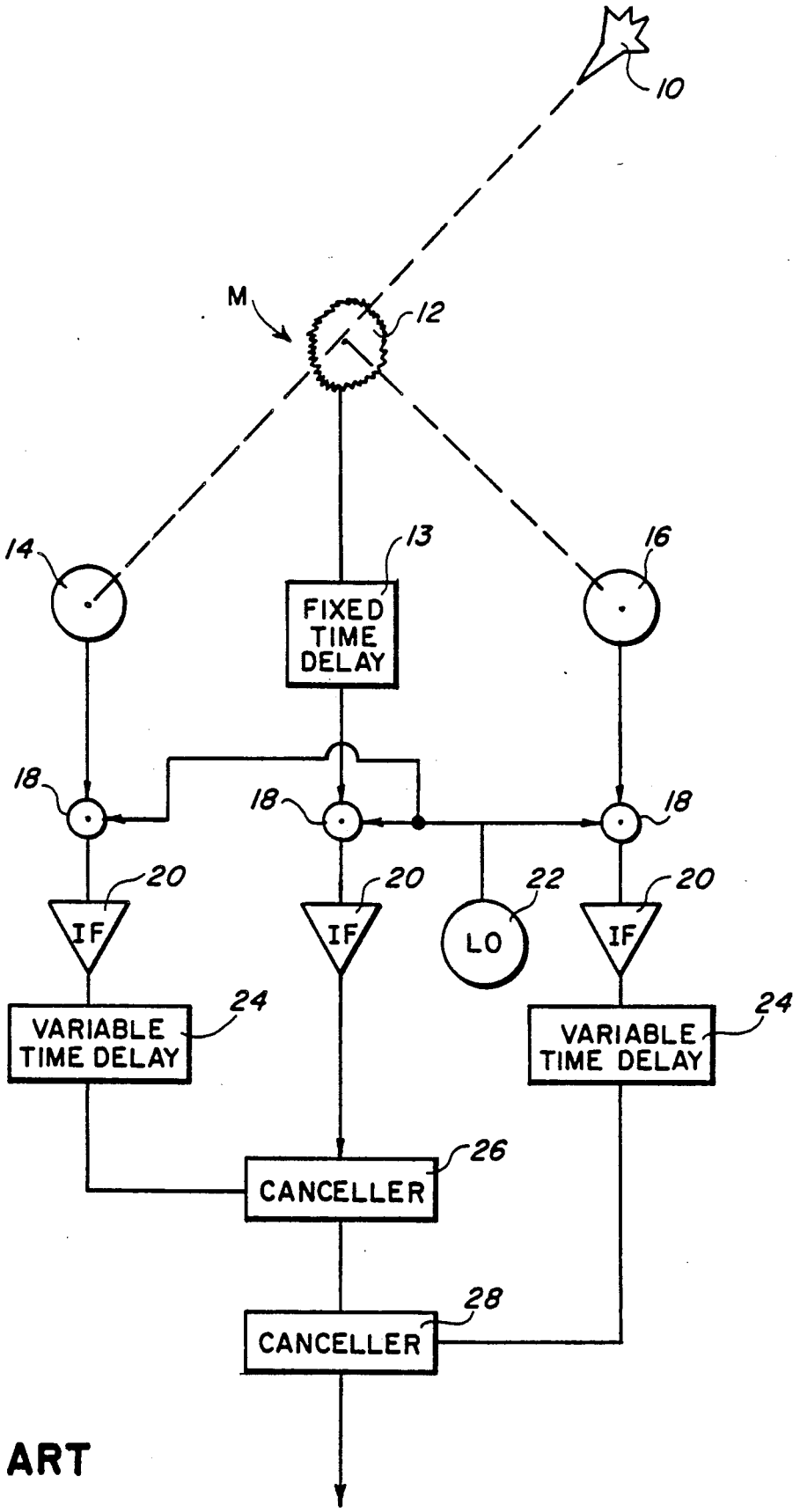
PRIOR ART FIG. 1
FIG. 1 is a prior art circuit which uses a radar ECCM technique for either on-target or standoff main-lobe noise jamming.
Figure 2:
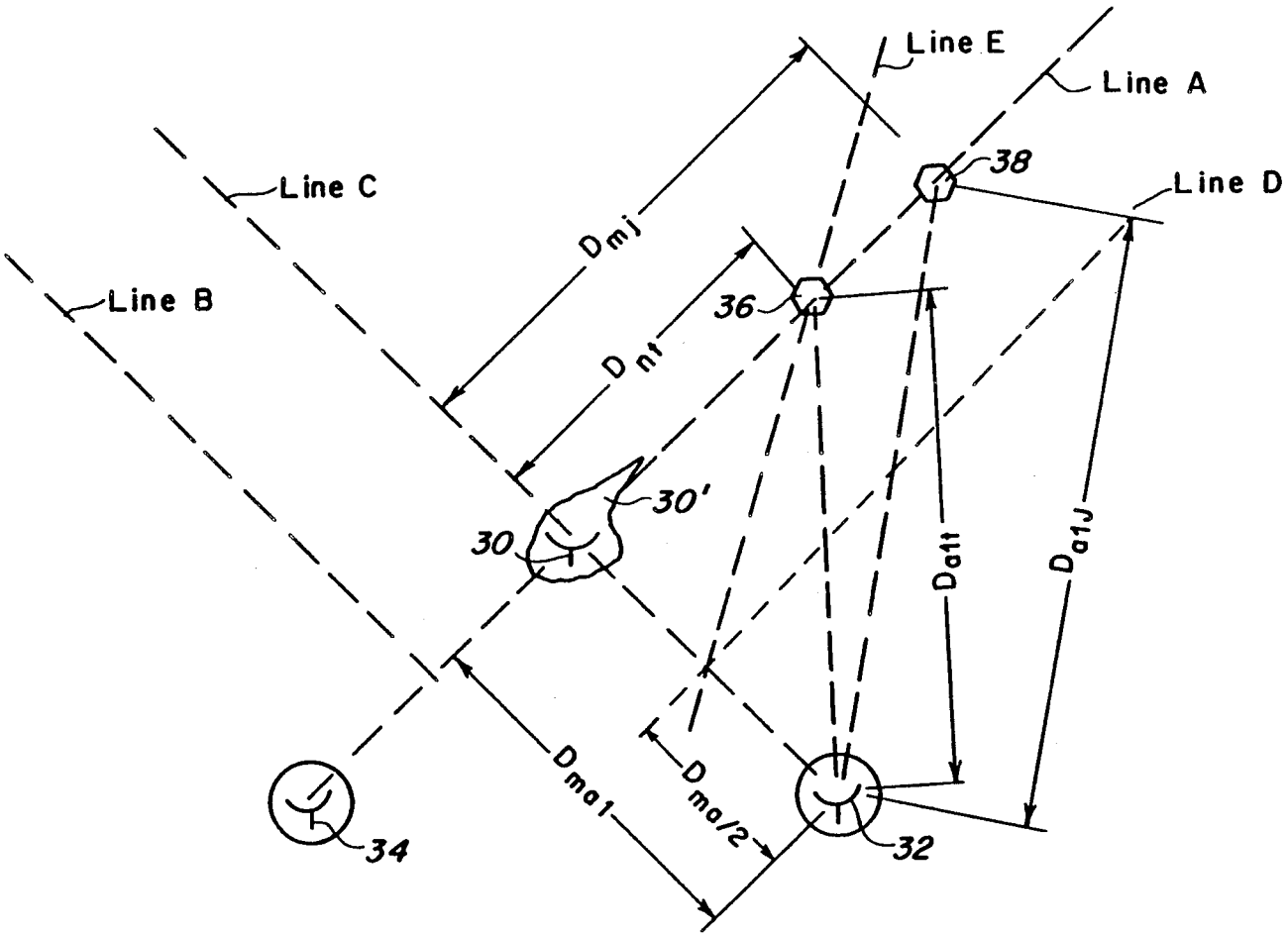
FIG. 2 is a diagram showing the relationship of main and auxiliary antennas in a configuration normally encountered when a target is being confronted.

Referring to FIG. 2, the environment for the elements necessary to remove the noise signal from the victim radar's main-lobe is shown in its functional relationship. A main antenna generally designated by the reference numeral 30 is shown in spatial relationship with auxiliary antennas 32 and 34. The victim radar transmits only with the main antenna 30, but receives at all three of the antennas 30, 32 and 34. On the assumption that the noise source is randomly polarized, the technique of the present invention requires the use of a dual polarized radar, the two auxiliary antennas 32 and 34, and appropriate signal processing which remains to be described in connection with FIGS. 3 and 4. Further with respect to FIG. 2, the technical basis on which the present invention relies anticipates the presence of a polarization agile noise source. The main antenna 30 therefore transmits in the direction of a target 36 a short pulse whose period T is reciprocal to the radar bandwidth of the radar bandwidth.

A polarization agile jamming source 38 whose noise bandwidth is considered to be the same as the radar's bandwidth is located behind the target 36 in the main-lobe 30' of antenna 30. The projection of the main-lobe in FIG. 2 is shown by the line A. During reception of the reflected signal from the target 36, the main antenna 30 and the auxiliary antennas 32 and 34 sample the spatial electromagnetic vector at twice the IF frequency, thus preserving the phase and magnitude on each polarization channel. On the assumption that the time sequence of vectors at the main antenna 30 is considered to represent a code sequence M(t), if the main and auxiliary antennas are sufficiently separated from each other, a time displaced code sequence also enters the antennas 32 and 34 as $A_1(t)$ and $A_2(t)$. The main and auxiliary code sequences, as will be described, are cross-correlated by the circuit depicted in FIG. 3 to find the time displacement mT, after which the auxiliary code sequence is delayed by Mt, then the main and delayed auxiliary sequences are applied to the cancellation circuit shown in FIG. 4 for removing the correlated noise component.

Referring again to FIG. 2, the distance $D_{mt}$ represents the range to the target 36 from the main antenna the distance $D_{mj}$ represents the range to the jammer 38 from the main antenna 30; the distance $D_{a1t}$ represents the range from the target 36 to the auxiliary antenna 32; and the distance $D_{a1j}$ represents the range to the jammer 38 from the auxiliary antenna 32. In addition, it is necessary to assume that the main antenna 30 and the auxiliary antenna 32 are sufficiently separated by the distance $D_{ma1}$ as shown in FIG. 2 and that the radar bandwidth is sufficiently high so that the following constraint is satisfied:

$$|\Delta R_M - \Delta R_{A1}| \geqq D_R \quad [1]$$

$$\text{where } \Delta R_M = |D_{mt} - D_{mj}| \quad [2]$$

$$\Delta R_{A1} = |D_{a1t} - D_{a1j}| \quad [3]$$

and $D_R$ = range cell depth

Equation [1] specifies a separation criteria for the jammer-target distance, main-auxiliary distance, and the distance $D_R$. It will be understood that when the separation criteria are met, and the polarization sequences are correlated in range, the target will appear in two different range cells. Consider the example below. Let T be the target y location, J be the jammer location, as indicated by "loci J, T," for each radar antenna. $E_i$ is the emitted jammer polarization of the ith range cell in the main antenna. Thus, the jammer 38 and the target 36 are separated by 3 range cells as measured by the main system, while the jammer 38 and the target 36 are separated by 1 range cell as measured by the auxiliary antenna 32. If we let $E_1$ represent the jammer polarization vector as measured for ith range cell by the main antenna 30, and accept the separation criteria and the location of the auxiliary antenna 32, a similar but 'rotated' polarization sequence with a different range/time alignment is measured for the PRI as shown below:

The vector sequence M as sampled at the main antenna 30:

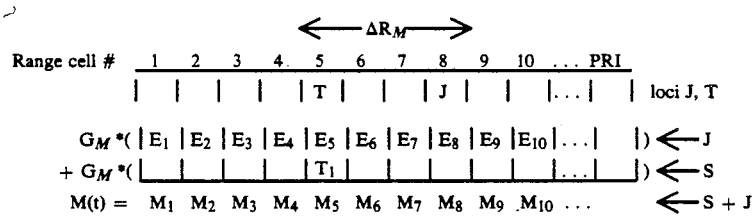

The vector sequence $A_1$ as sampled at auxiliary antenna

The vector sequence $A_1$ as sampled at auxiliary antenna 34:

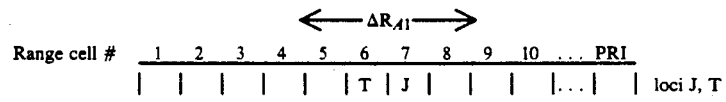

-continued

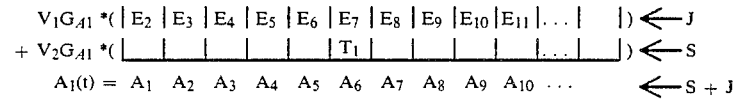

where:

$G_M$=Gain of main antenna 30

$G_{A1}$=Gain of auxiliary antenna 32

$V_1$=Consequence of rotation of the jammer polarization due to the spherical wavefront, antenna orientation and angle to jammer, and other environmental effects relative to the jammer polarization in the main system.

$V_2$=Consequence of rotation of the target polarization due to the bistatic angle between main-target-auxiliary, antenna orientation and angle to target, and other environmental effects relative to target polarization in the main system.

For the purpose of the example just described, the following simplifying assumptions are made: one, $V_1=V_2=V$ (the target and jammer polarization are subject to the same rotation); two, the environment is considered to be free space; and three, the jammer is assumed to be broadbeam so that antennas 30, 32, and 34 are covered by the mainlobe of the jammer 38.

Figure 3:
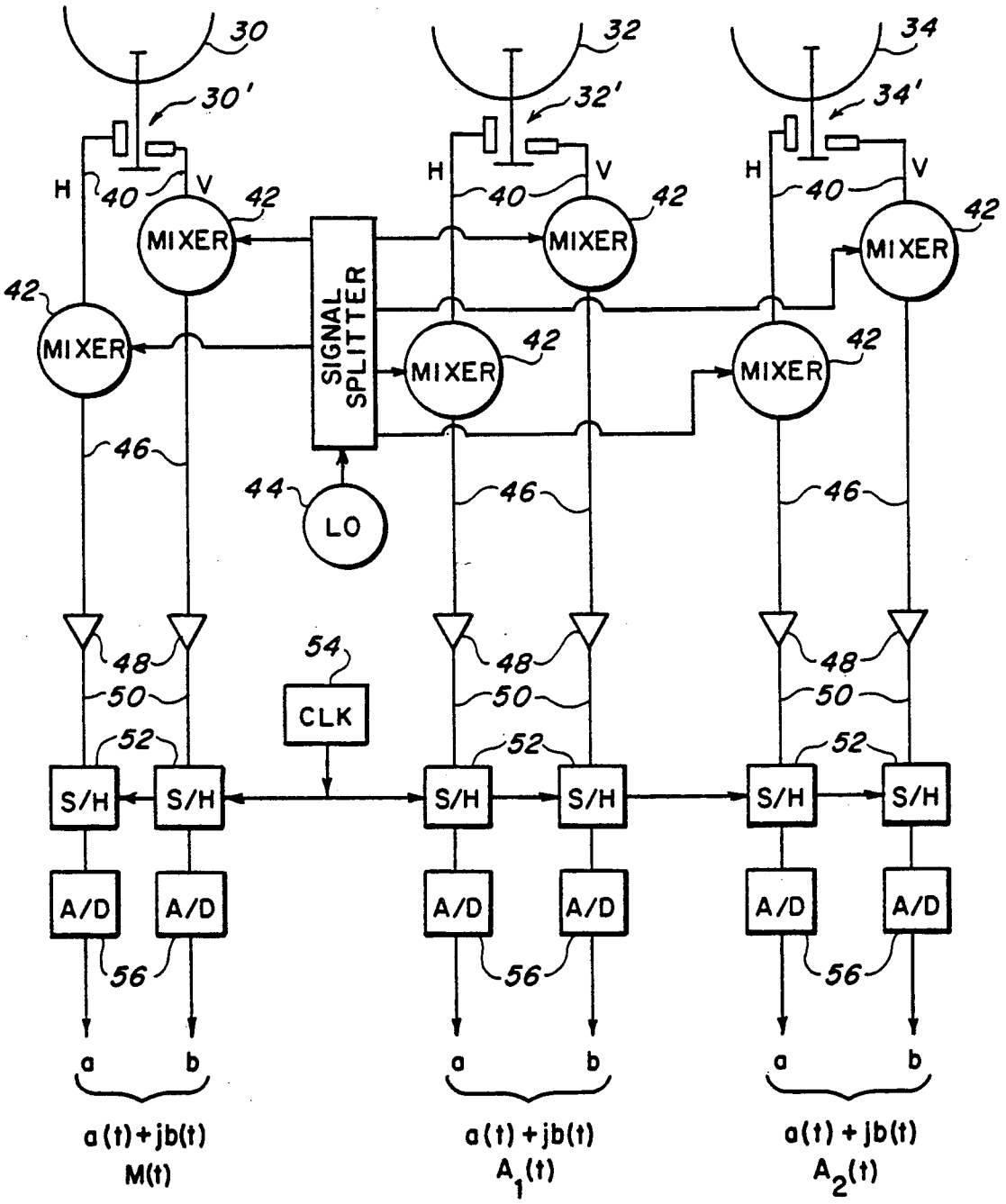
FIG. 3 is diagram showing the circuit which forms a part of the invention for producing the digital vector sequences from a configuration based on FIG. 2.

The measurement of the polarization vector at each antenna is accomplished by the circuit as shown in FIG. 3. With reference being made to FIG. 3, the three antennas 30, 32, and 34 each have transmission means connected to a dual mode transducer 30', 32', and 34' of the type well known to those skilled in the art. That is, for each signal received by the dual mode transducers 30', 32', and 34', the transducer will separate the received electromagnetic vector into two orthogonal components, which for convenience and simplicity herein are called 'H' and 'V' and depicted as such on the output transmission lines 40 connected to the dual mode transducers. The H and V signal channels are supplied to mixers 42 each of which is supplied with a local oscillator signal from the local oscillator generator 44 which is used to form the transmitted RF signal. By means of transmission lines 46, the output of each of the mixers 42 is applied to an intermediate frequency filter and amplifier 48. The IF signals produced at the output terminals of the IF filters and amplifiers are coupled by transmission lines 50 to sampling circuits 52, each of which is supplied with a common reference clock signal from a clock 54. The signal following the sampling and hold is converted to a digital vector sequence by means of analog to digital converters 56 and produce the signals M(t), $A_1(t)$, and $A_2(t)$ for further processing by the circuit shown in FIG. 4.

Figure 4:
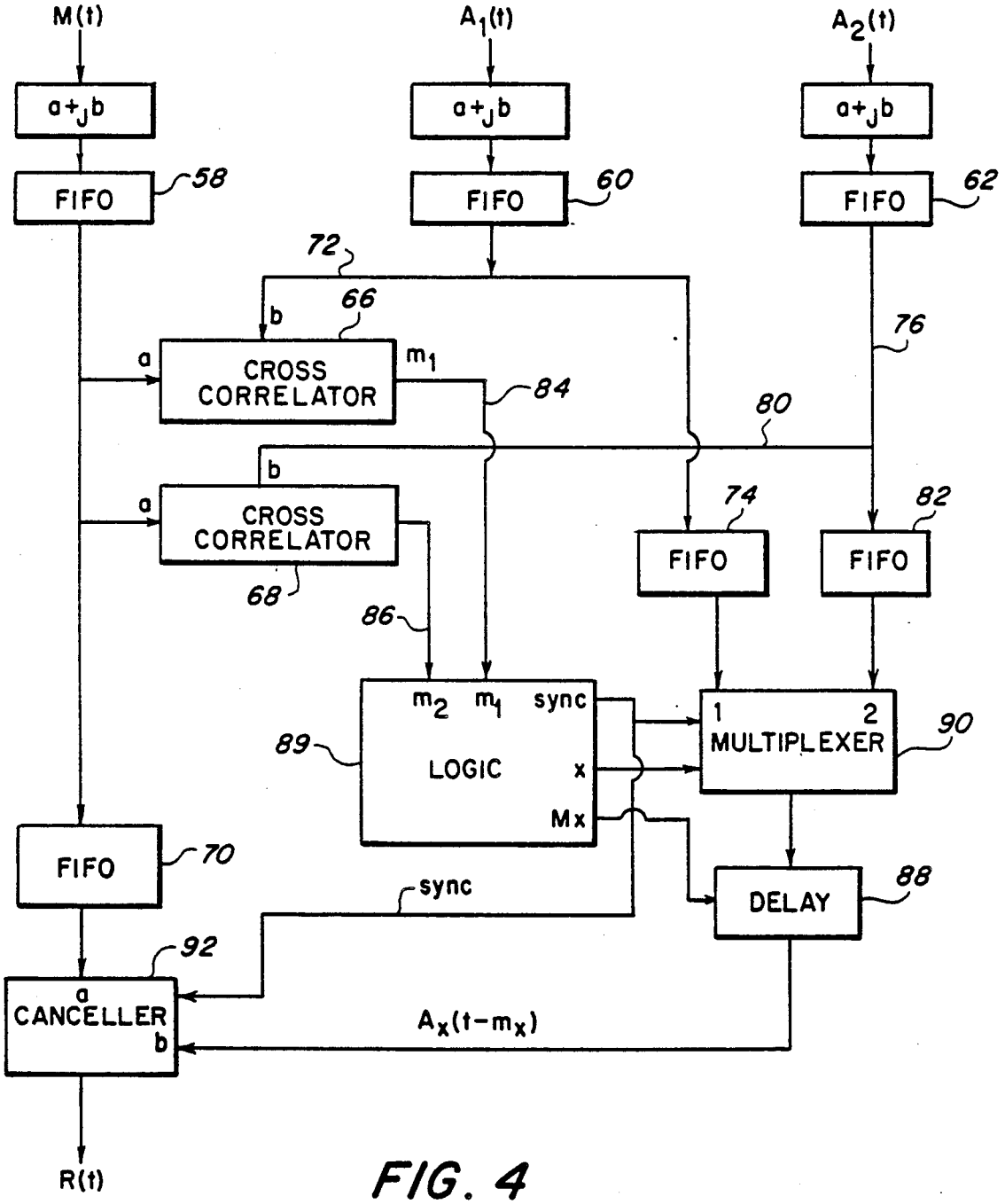
FIG. 4 is a circuit diagram according to the invention which shows additional elements for removing the stand-off random noise from the signals provided from the circuit of FIG. 3.

First, as shown in FIG. 4, the digital vector sequences M(t), $A_1(t)$, and $A_2(t)$ are temporarily buffered in FIFO's designated herein by the reference numerals 58, 60 and 62. The transmission of the signal from the FIFO 58 is by means of line 64 to identical cross-correlators 66 and 68 and, simultaneously to a FIFO 70. The output signal of the FIFO 60 is applied by suitable transmission means 72 to input terminal b of cross-correlator 66 and to the input terminal of the FIFO 74. The output signal produced by the FIFO 62 associated with the auxiliary antenna 34 is applied simultaneously by suitable transmission means 76 and 80 to input terminal b of cross-correlator 68 and to the input terminal of FIFO 82. The transmission means 84 and 86 direct the output of the cross-correlators 66 and 68 to a logic circuit herein designated generally by the reference numeral 89. Thus, the cross-correlation between the main and auxiliary signals for every PRI are accomplished in cross-correlators 66 and 68. M(t) and $A_1(t)$ can be considered random variables which are almost wide-sense stationary over a single PRI. Thus, the value $m_1=(\Delta R_M-\Delta R_{A1})$ is determined by cross-correlating the two processes M(t) and $A_1(t)$ and selecting the value of $m_1$ which produces a maximum cross-correlation, $R_{MA1}$.

$$R_{MA1}(m_1) = E\{M(t+m_1)A^*(t)\} \quad [4]$$

$$\max R_{MA1}(m_1) \rightarrow m_{1T}$$

$$m1 = PRI \text{ to } PRI$$

where T is the sample period and $m_{1T}$ is equivalent time separation between J in M and $A_1$.

For the example stated above, one can show:

$$R_{MA1}(-PRI) \approx 0$$

$$R_{MA1}(-2) \approx 0$$

$$R_{MA1}(-1) \approx \text{Max}$$

$$R_{MA1(0)} \approx 0$$

$$R_{MA1}(1) \approx 0$$

$$R_{MA1(2)} \approx 0$$

$$R_{MA1}(PRI) \approx 0$$

It will be seen that the delay, $m_1=-1$, should be applied to the auxiliary sequence $A_1(t)$ by the delay circuit of FIG. 4. In this example, it is noted that the jammer and target 36 are co-located along line A as shown in FIG. 2. Thus, the $m_2$ produced by the cross correlator 68, which is the cross-correlation between M(t) and $A_2(t)$, would be 0. Under such circumstances, therefore, the logic circuit of FIG. 4 selects the signal $m_1$ and transmits it to the multiplexer 90. The multiplexer 90, in turn selectively receives the output of the FIFOs 74 and 82. The sync pulse from the logic circuit 89 indicates completion of the $m_1$ and $m_2$ comparison, thus enabling the multiplexer 90, the delay 88, and the canceller 92. In the present arrangement, the multiplexer 90 functions to unload the correct FIFO 74 or FIFO 82. In the case just illustrated, the FIFO 74 is selected and thus $A_1(t)$ is delayed by an amount equal to $m_1$.

The removal of the jamming component in order to carry out the invention is completed by the canceller circuit 92, which may be a digital open loop canceller of the type well known in the art. The canceller circuit 92 reads FIFO 70 which feeds the sequence M(t) into the "main" channel a of the canceller while the "auxiliary" channel b of the canceller 92 is fed with the range correlated selected auxiliary. In the example just given, the latter channel is supplied with the signal $A_1(t-m_1)$. The optimal weight will be:

$$W_{opt} = \frac{\sum^{n} M(t)A(t - m_1)}{\sum^{n} A(t - m_1)A(t - m_1)} \quad (5)$$

for the example above n=2, thus:

$$W_{opt} = \frac{G_m}{G_{A1}V} \quad (6)$$

and the target information residue R(t) produced by the canceller 92 will be:

$R(1)$ $M(1) - wA(0) = G_m E_1 - G_m/(G_{A1}V)G_{A1}VE_1 = 0$ $R(2)$ 0

$R(3)$ 0

$R(4)$ 0

$R(5)$ $M(5) - wA(4) = G_m(E_5 + T_1) - G_m/(G_{A1}V)G_{A1}VE_5 = G_m T_1$ $R(6)$ 0

$R(7)$ $M(7) - wA(6) = G_m E_7 - G_m/(G_{A1}V)G_{A1}V(E_7 + T_1) = -G_m T_1$ $R(8)$ 0

$R(9)$ 0

$R(10)$ 0

$R(PRI)$ 0

It will be seen that the target appears in range cell number 5 and its "shadow" appears in range cell number 7.

It will be appreciated from the description of the preferred embodiment thus far that the illustration in FIG. 2 and the adoption of equation (1) demonstrate the need for two auxiliary antennas. Thus, it will be appreciated that when the jammer 38 and target 36 are co-located along line A line B of FIG. 2, then $R_m$ equals $R_{A2}$. Likewise, when the jammer 38 and target 36 are co-located along the line C or line D of FIG. 2, then $\Delta R_M$ equals $\Delta R_{R1}$. In both cases $\Delta R_M - \Delta R_{AX}1 = 0$. Therefore, along these lines of symmetry antenna 30 and the single auxiliary antenna X are enable to satisfy the separation criteria independently of the sample frequency.

Figure 5:
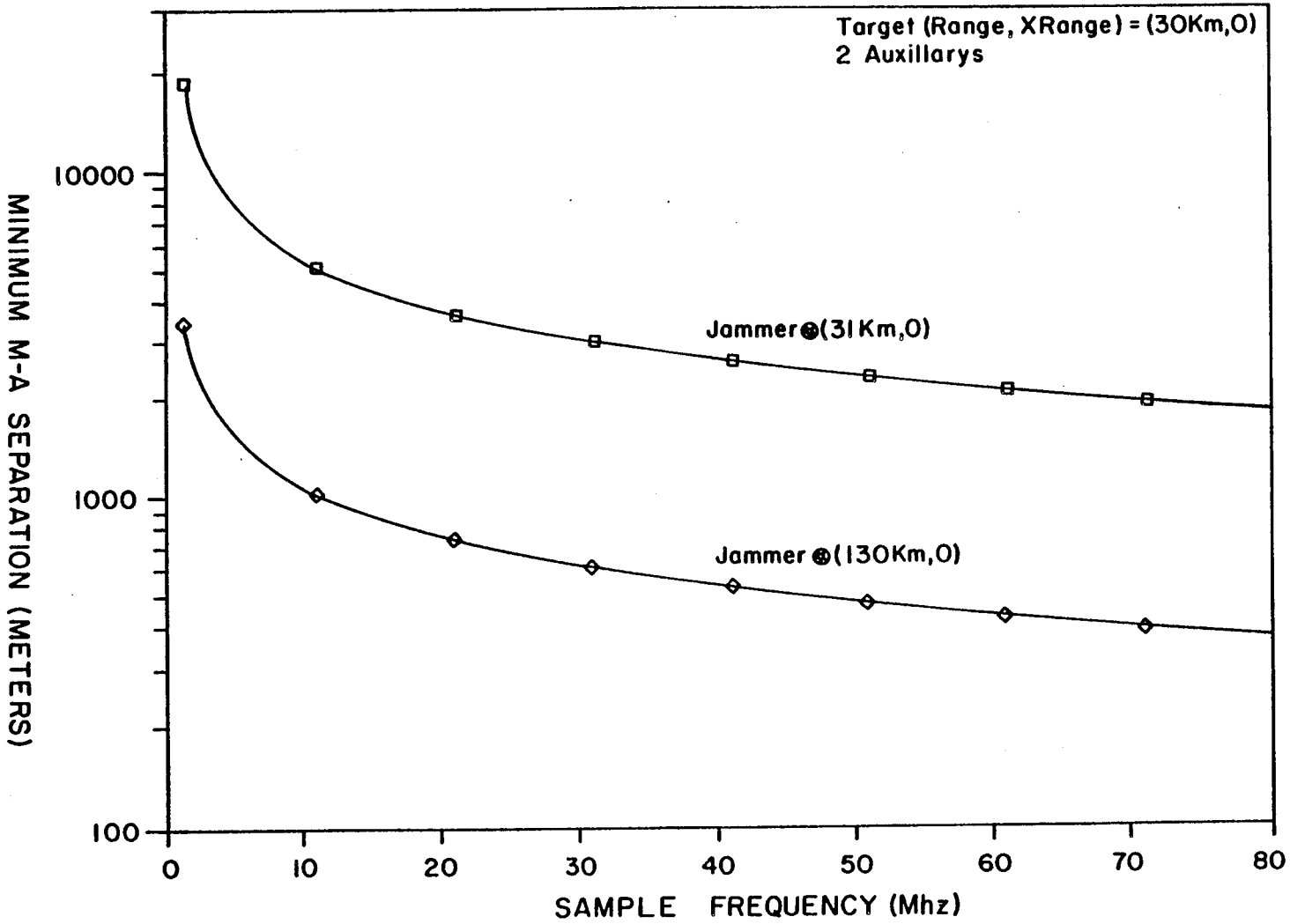
FIG. 5 shows the relationship between the minimum main auxiliary spacing and its dependence on sample frequency for a fixed target and jammer.
Figure 6:
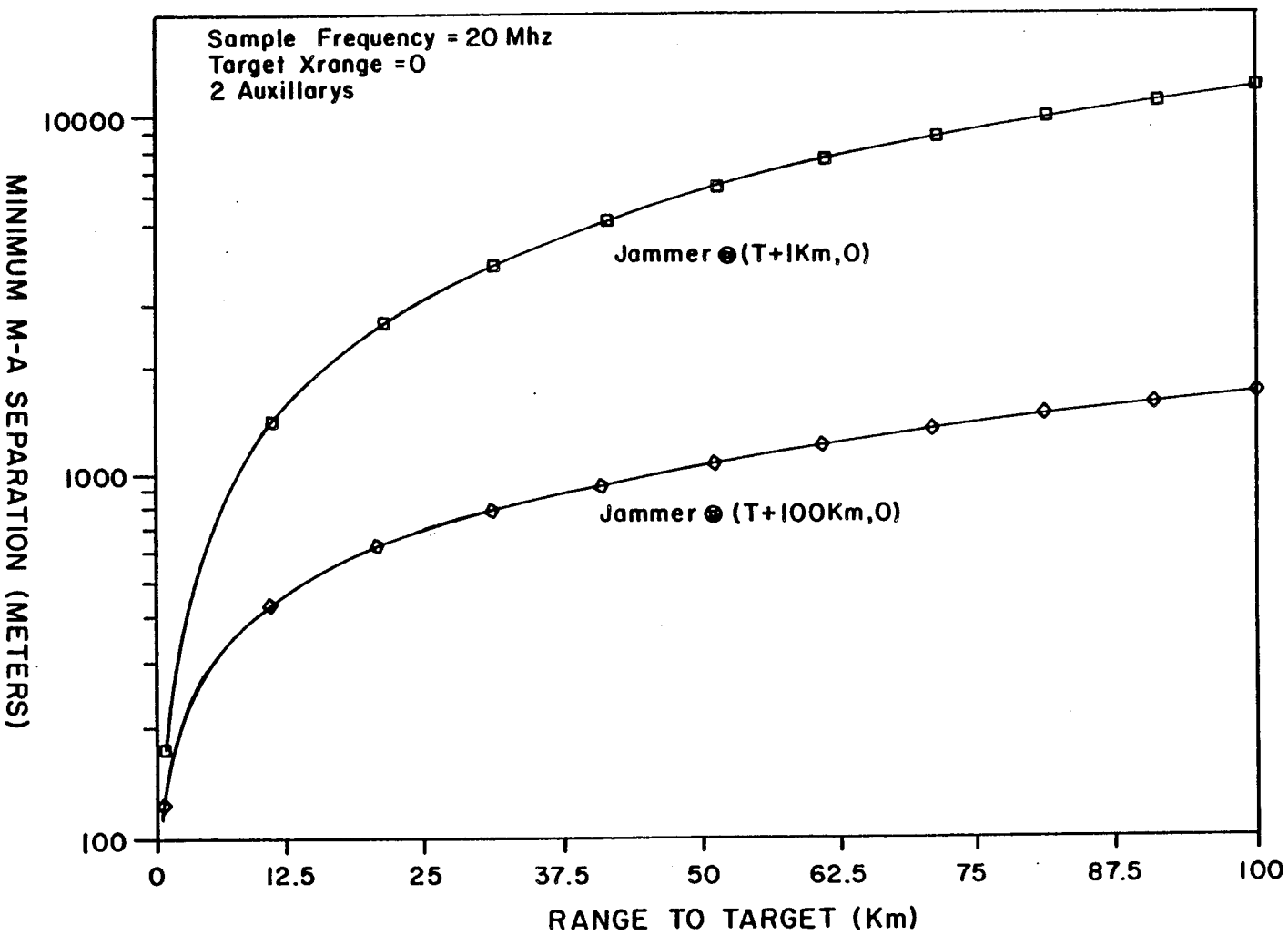
FIG. 6 demonstrates an illustration of the relationship of the minimum-main auxiliary antenna spacing and its dependence on range to target with jammers located behind the target.
Figure 7:
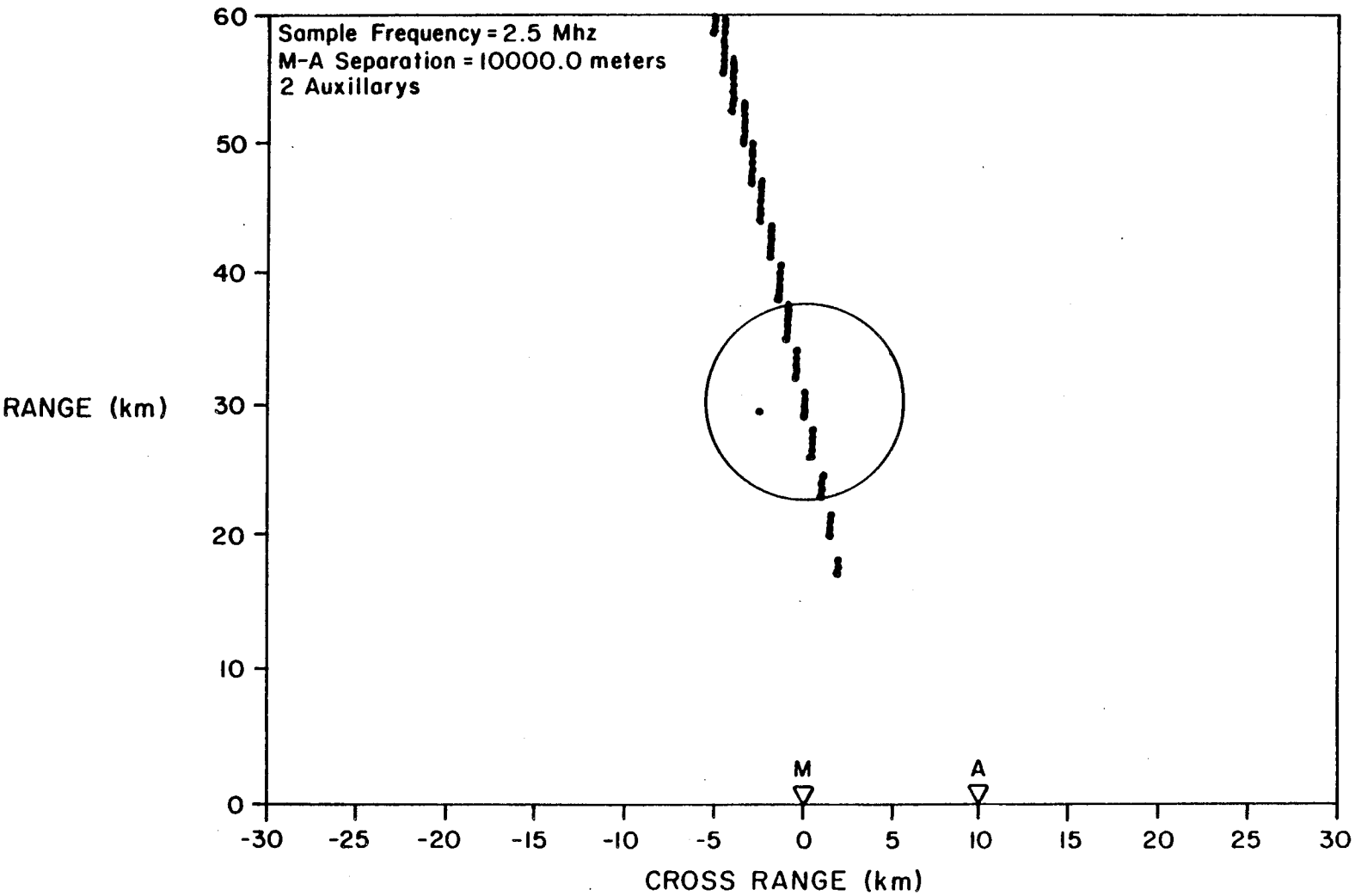
FIGS. 7–27 show simulations for determining when the separation criteria is violated by having the "blind spot" regions depicted as darkened areas.
Figure 8:
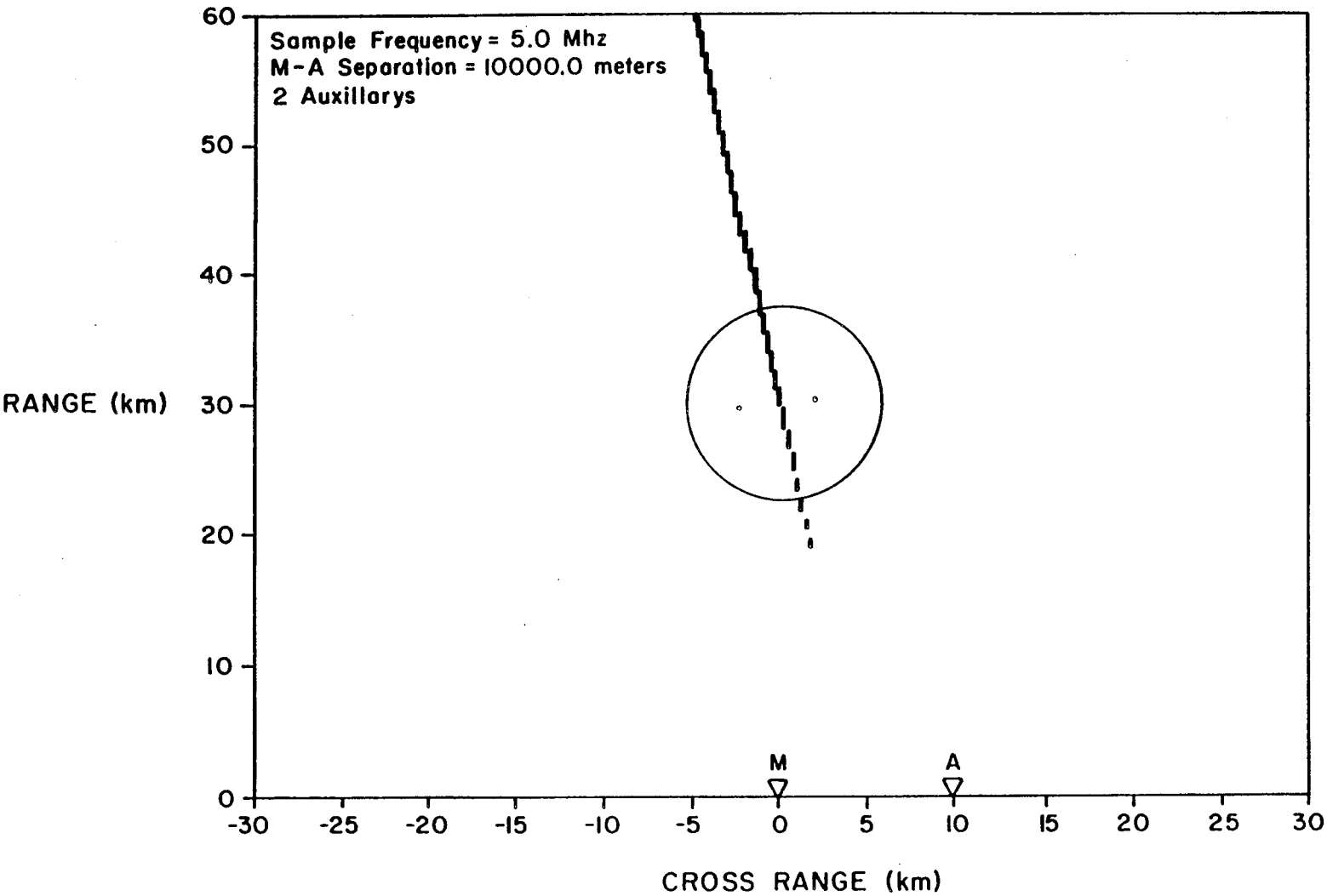
Figure 9:
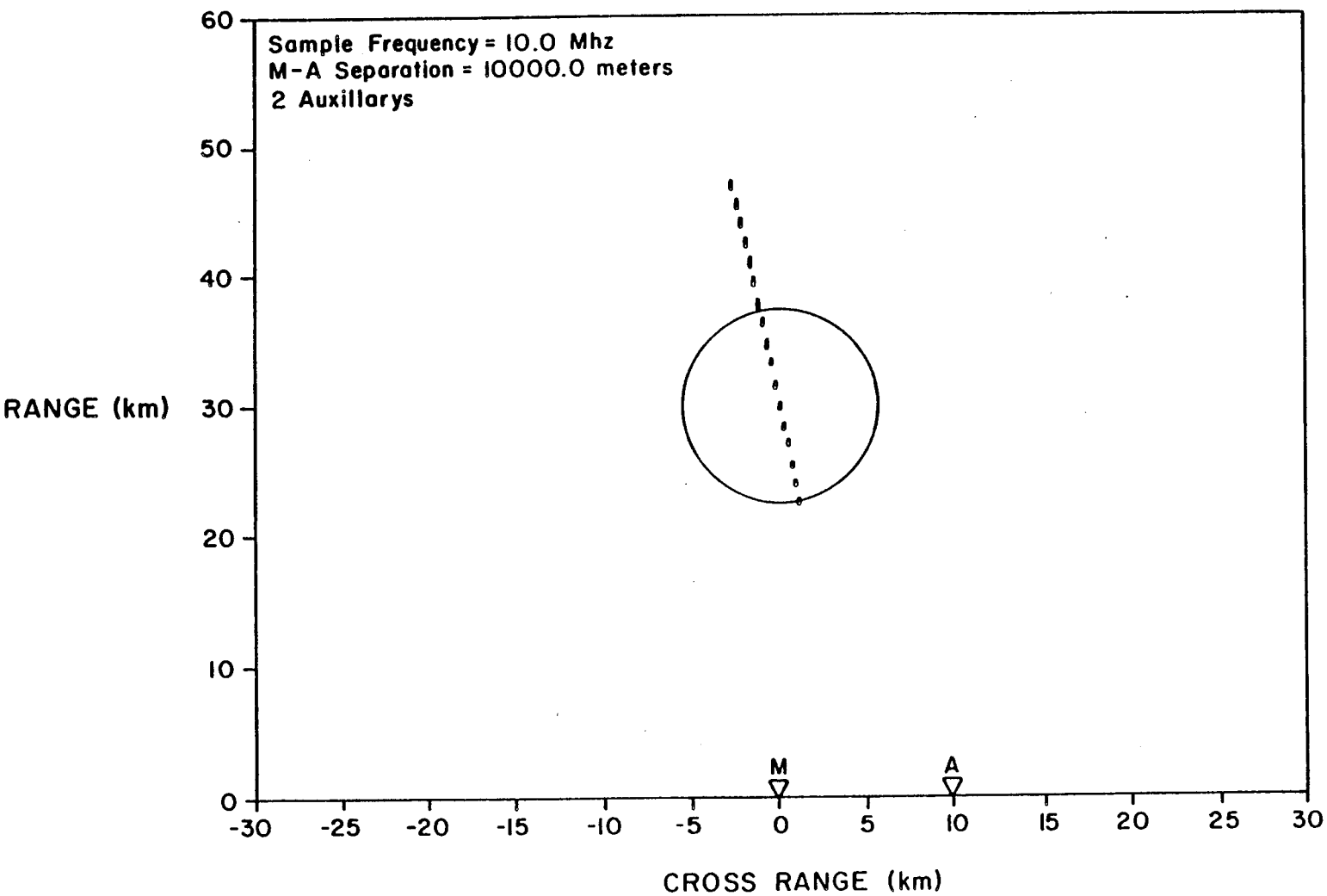
Figure 10:
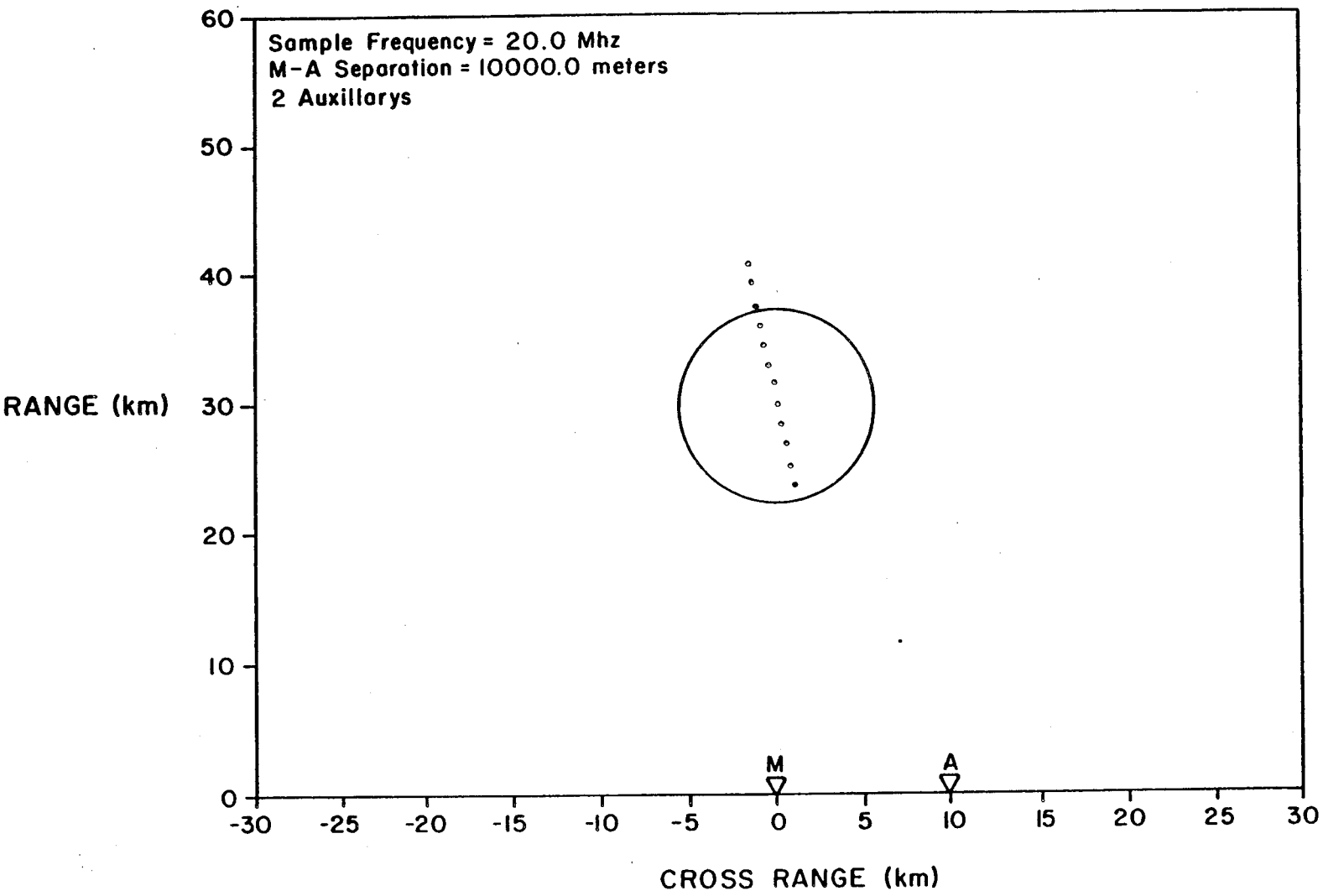
Figure 11:
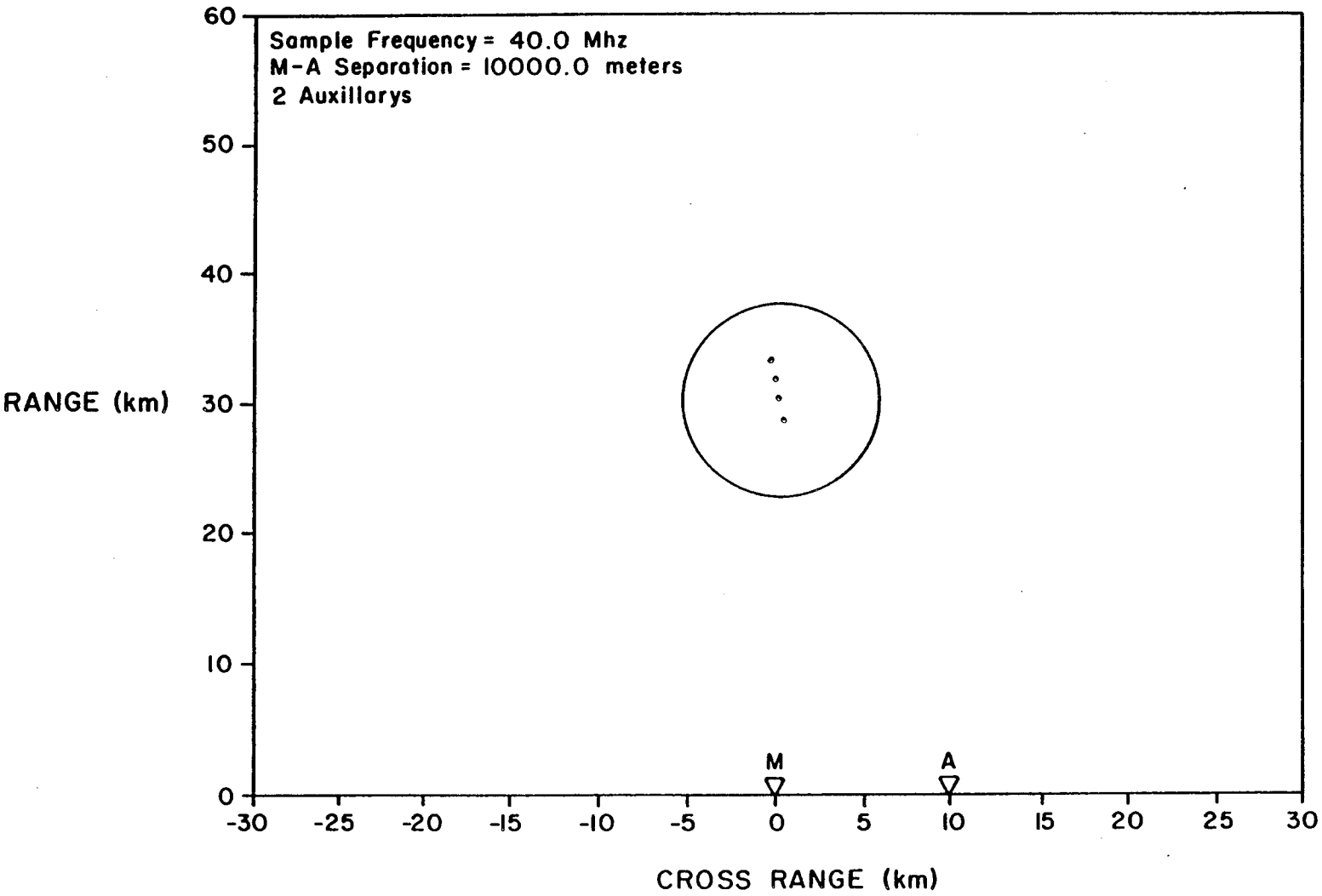
Figure 12:
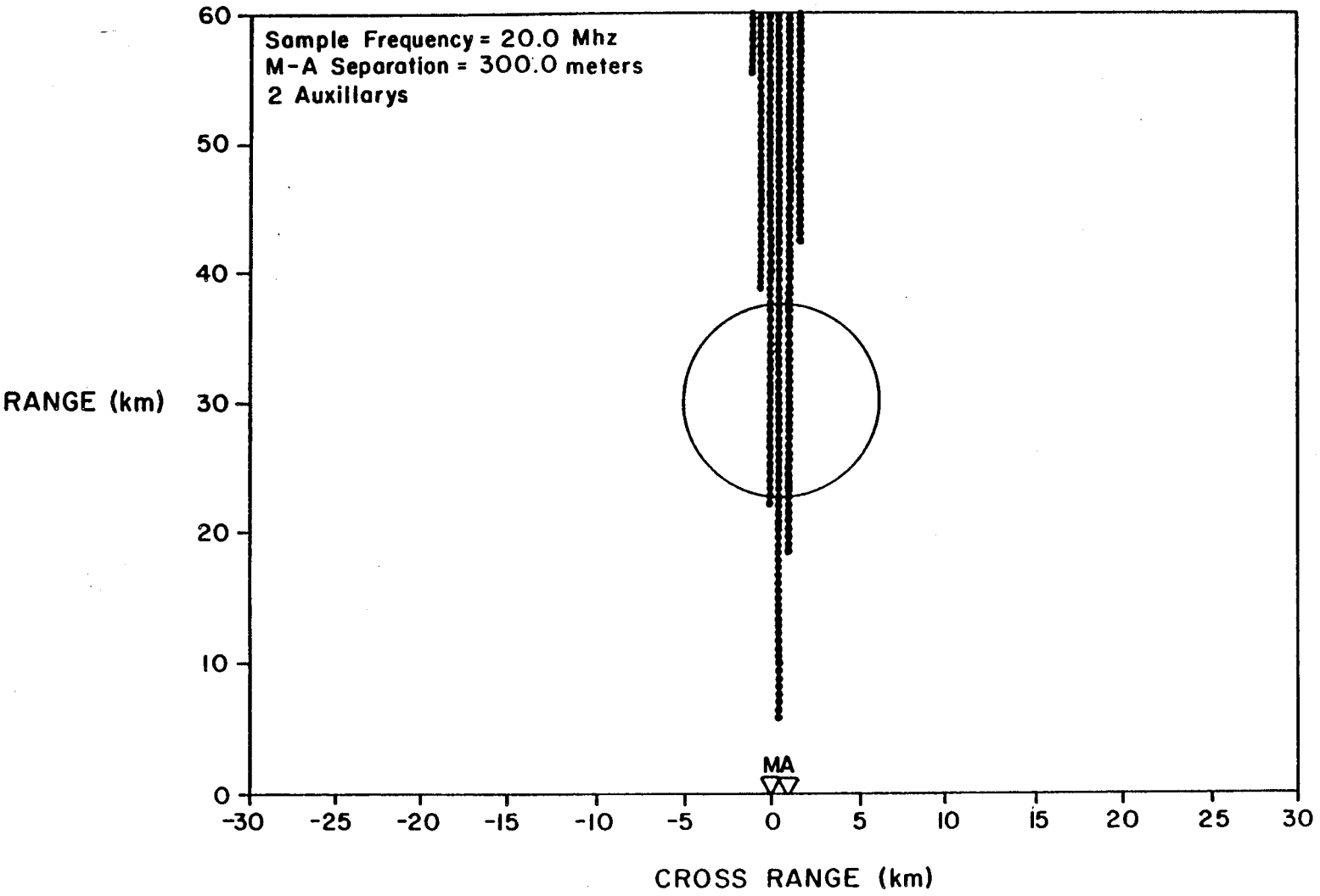
Figure 13:
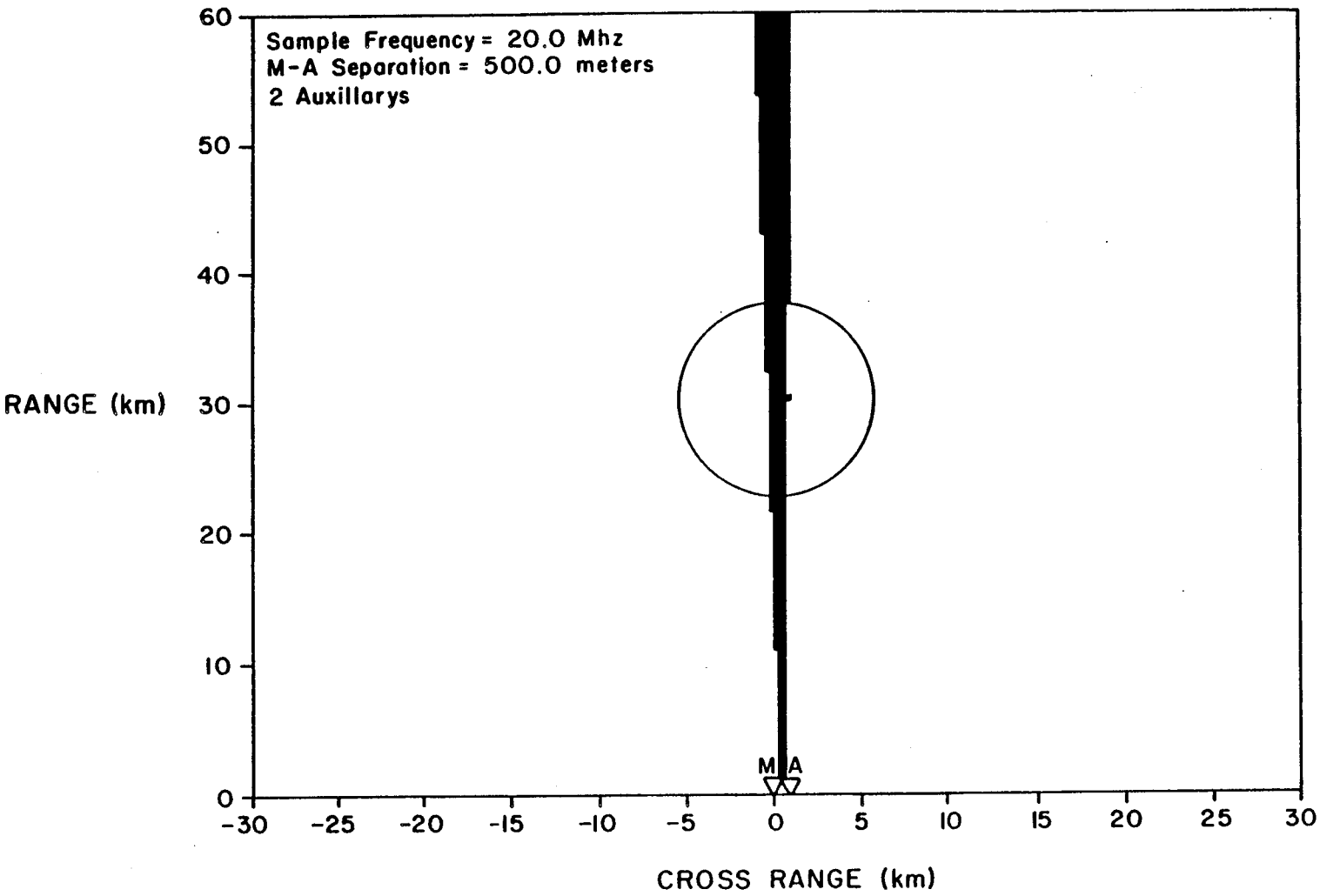
Figure 14:
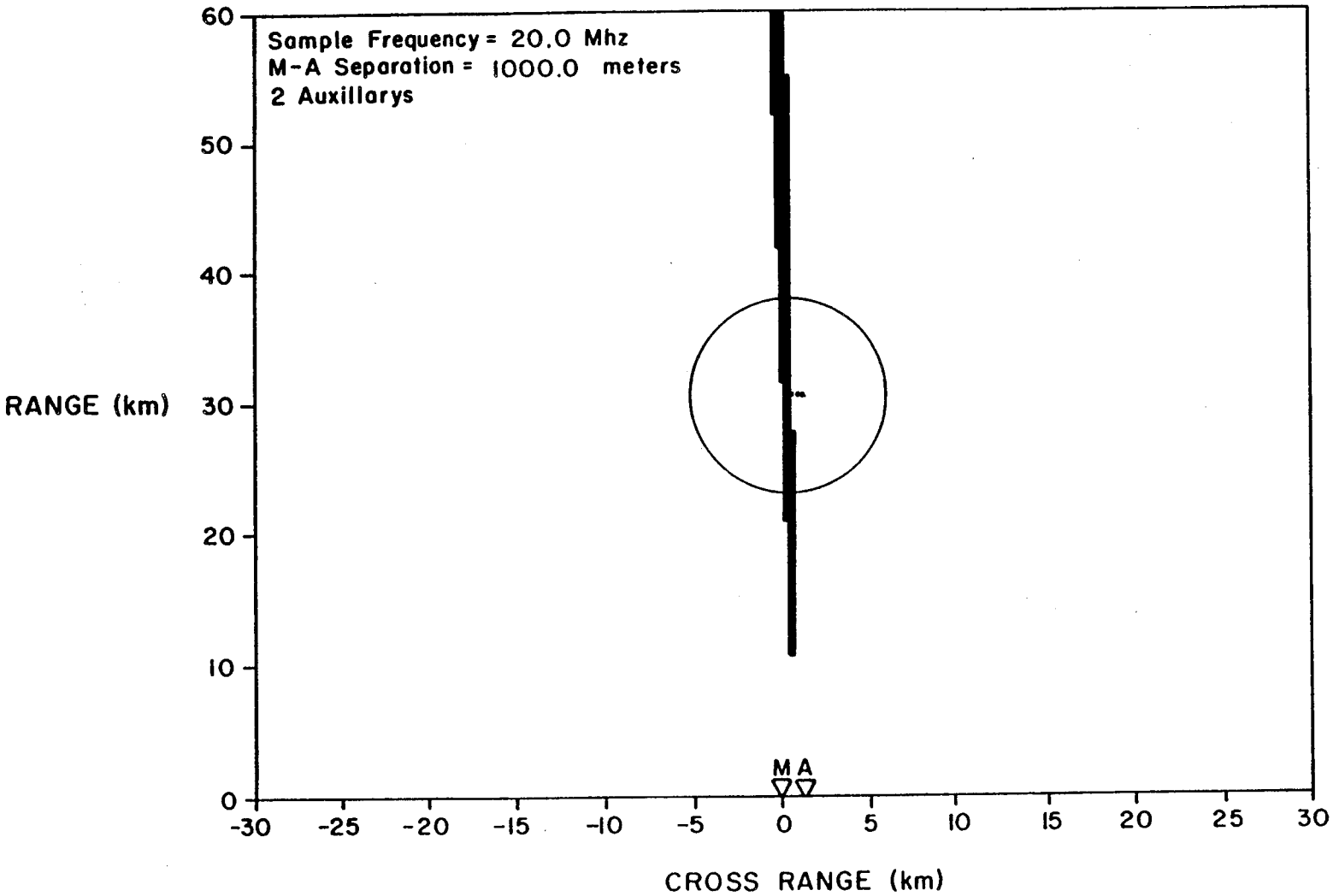
Figure 15:
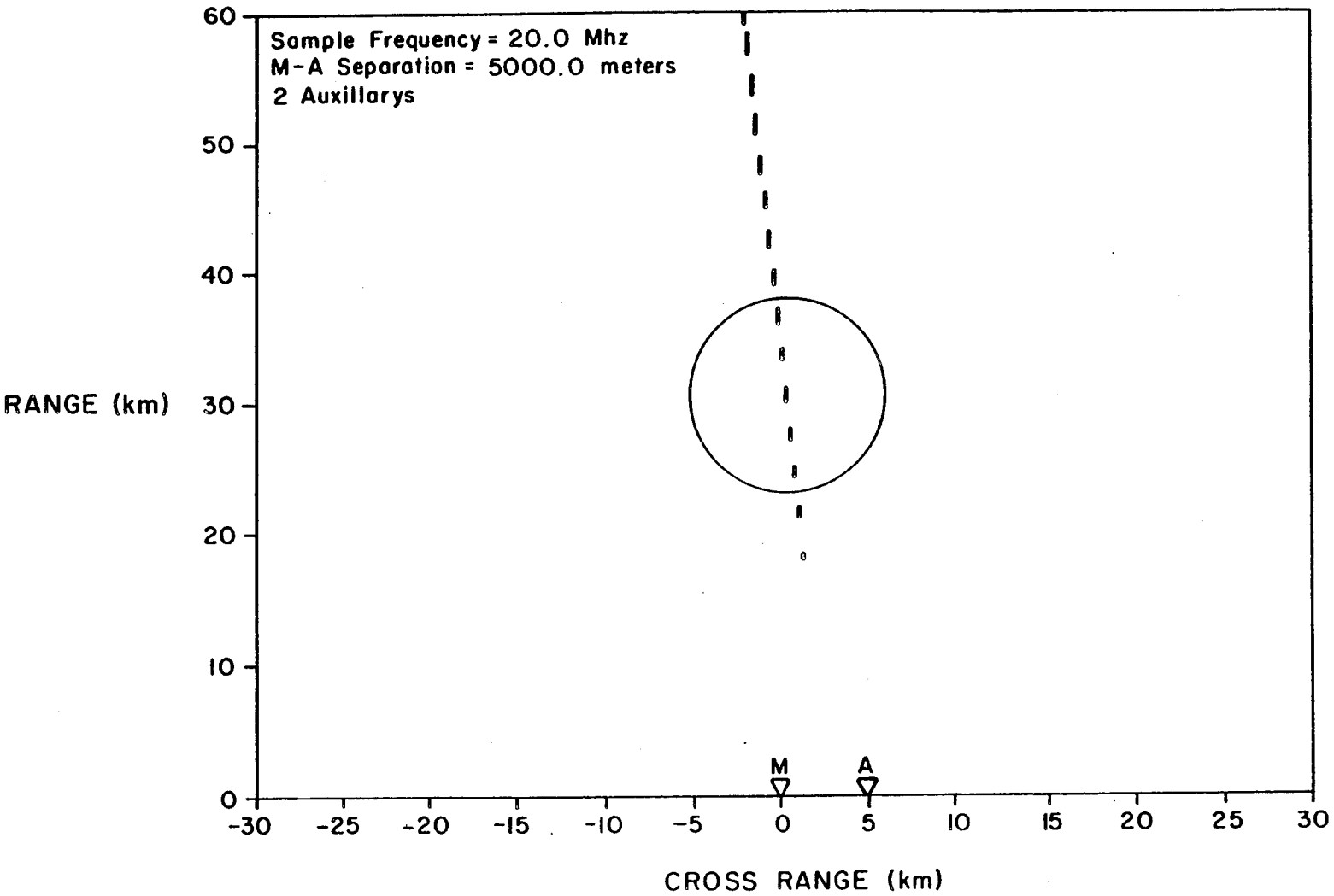
Figure 16:
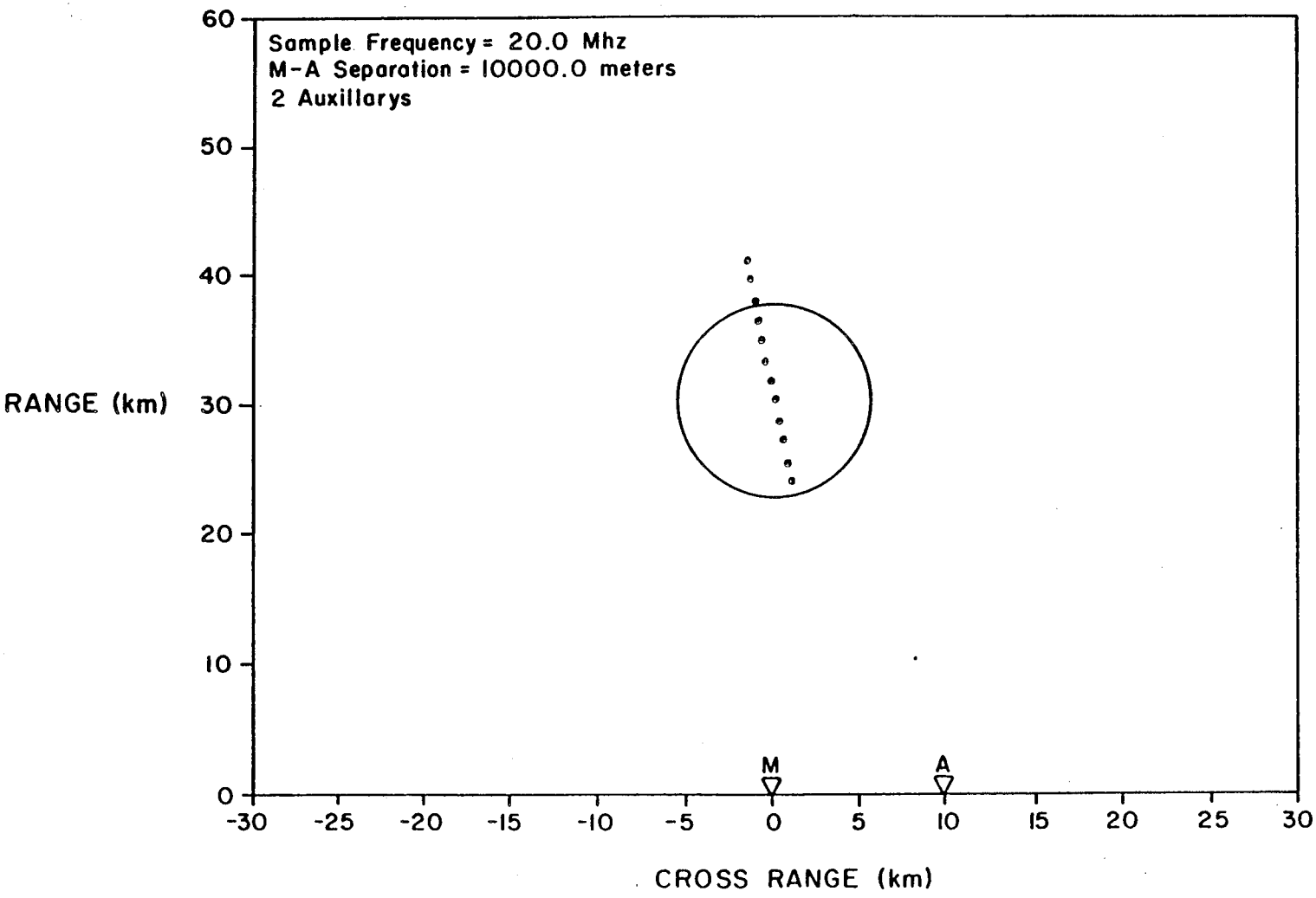
Figure 17:
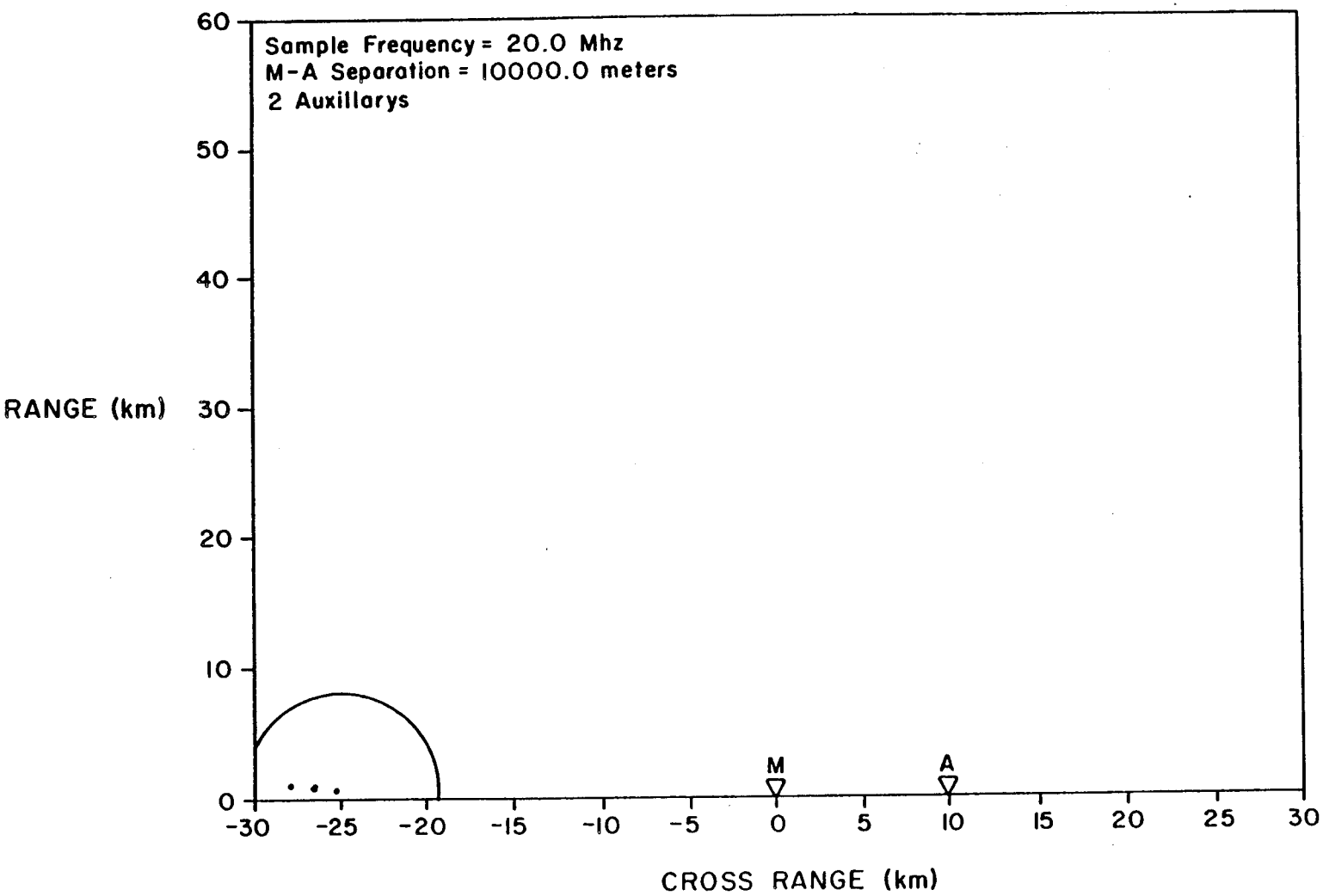
Figure 18:
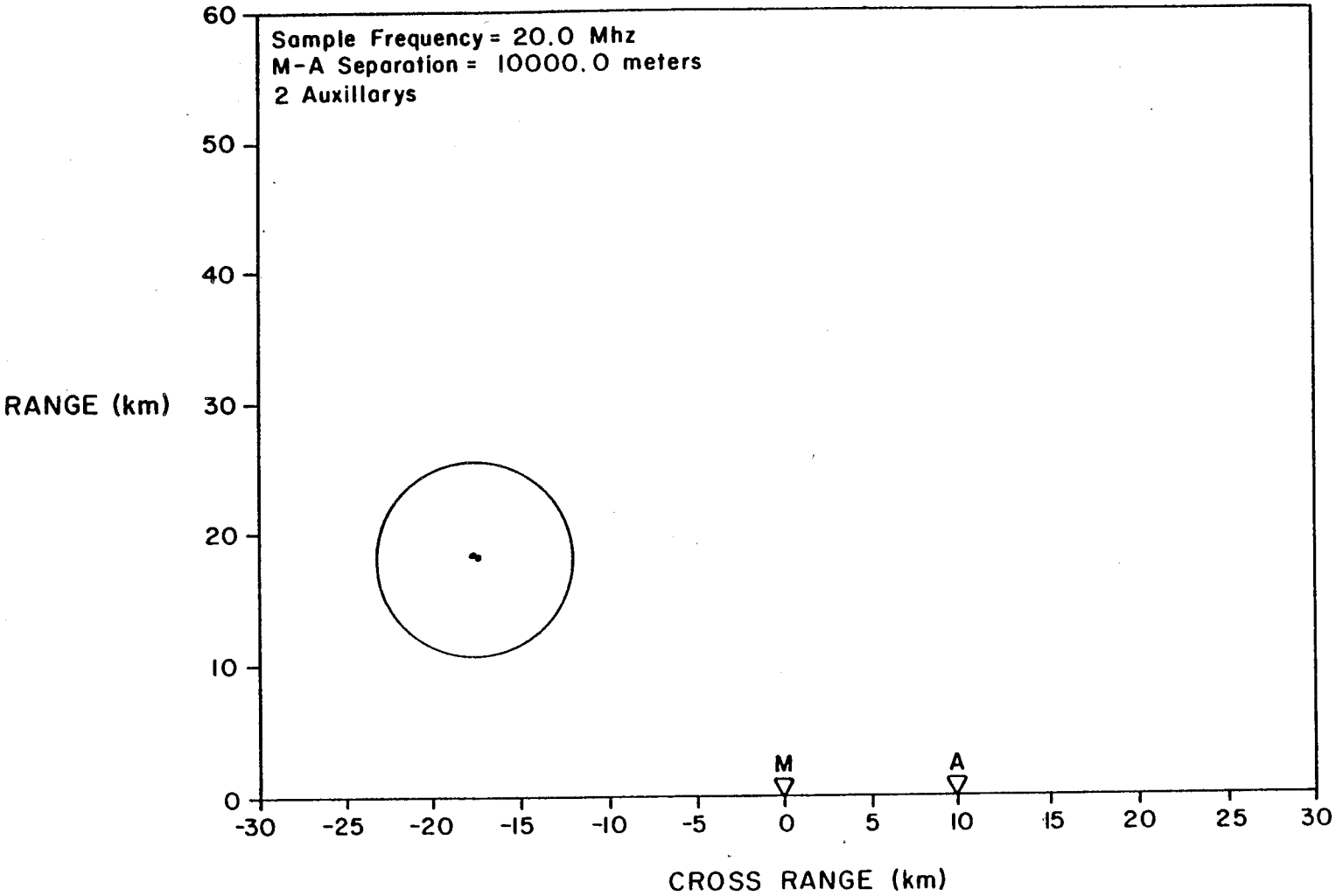
Figure 19:
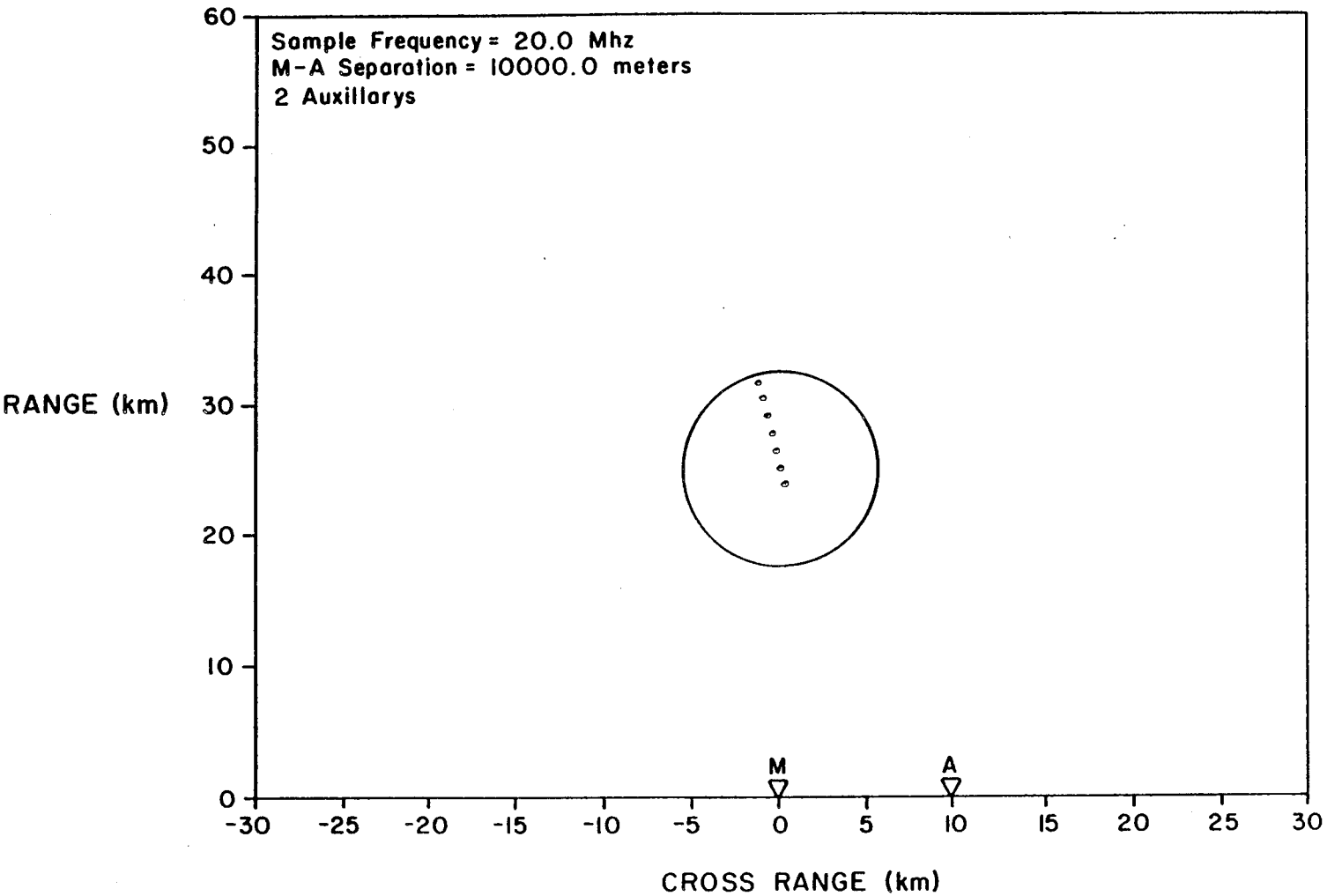
Figure 20:
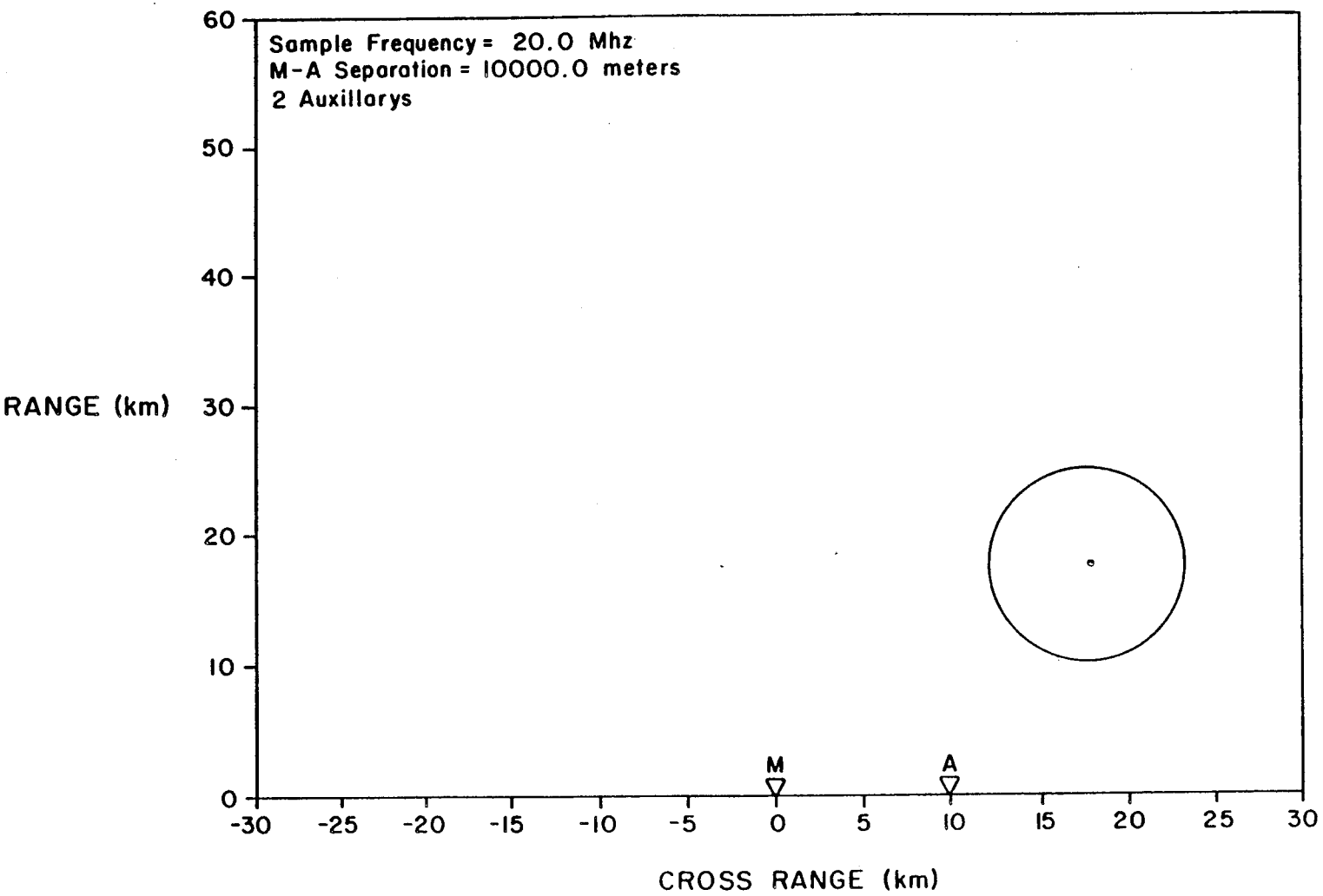
Figure 21:
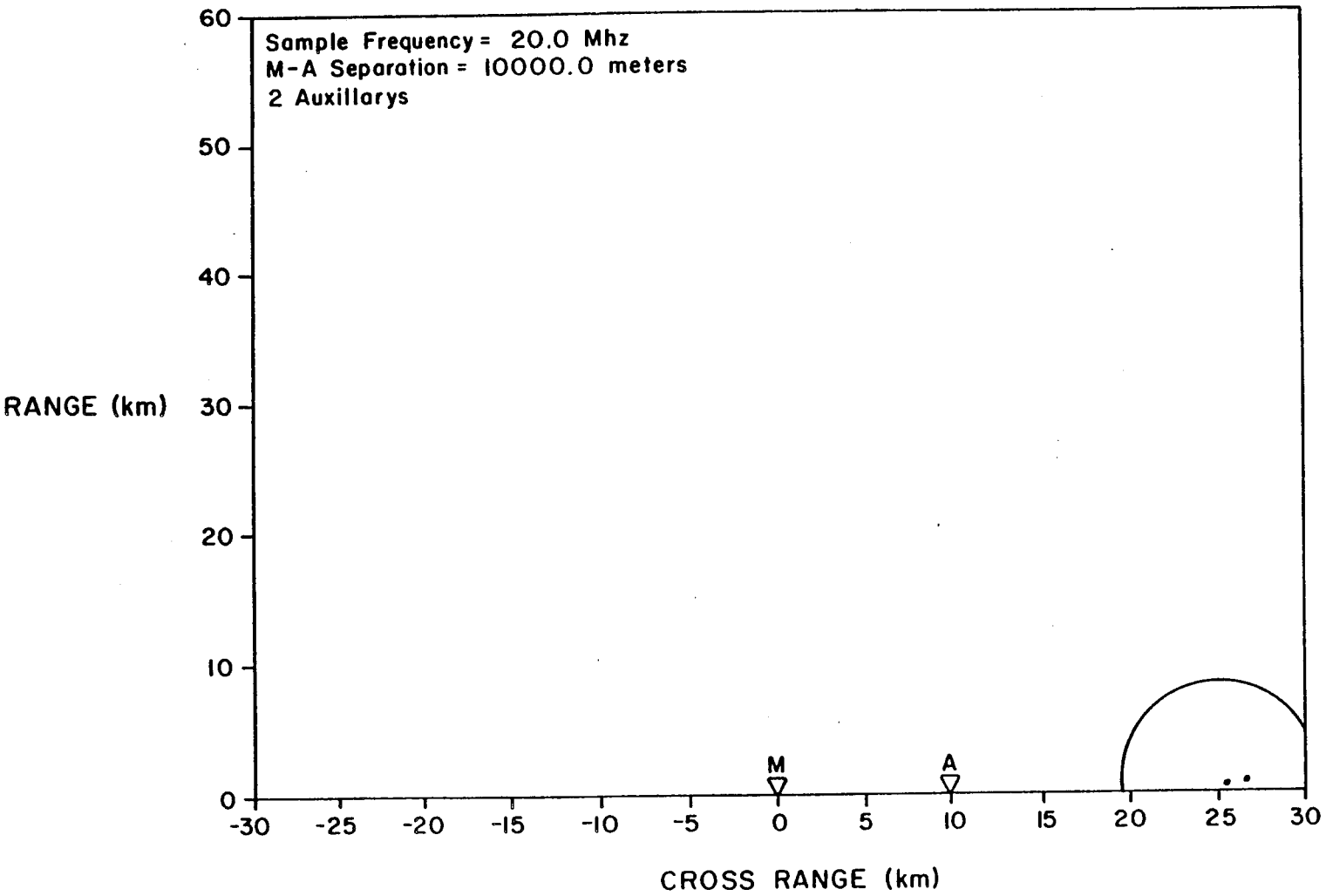
Figure 22:
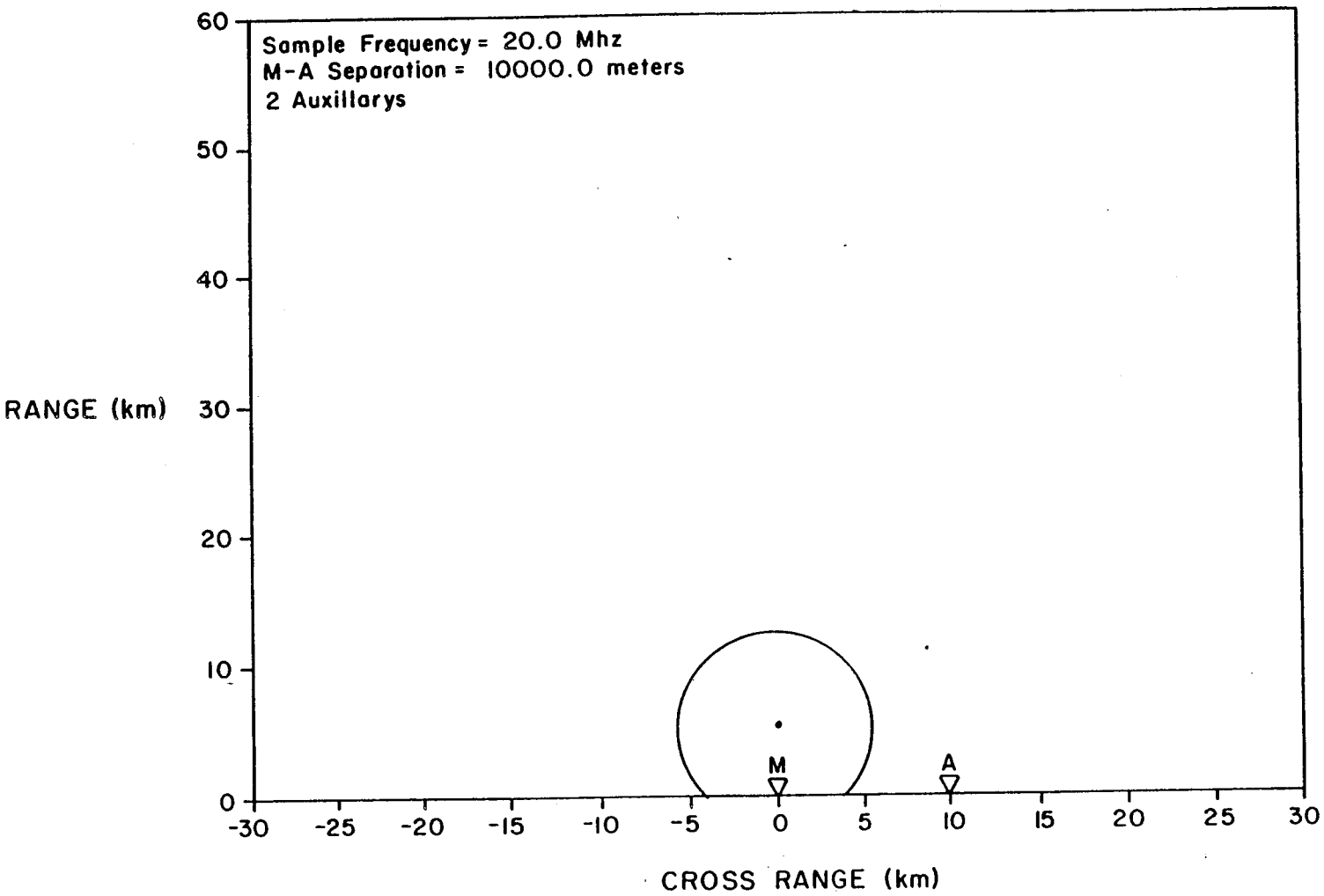
Figure 23:
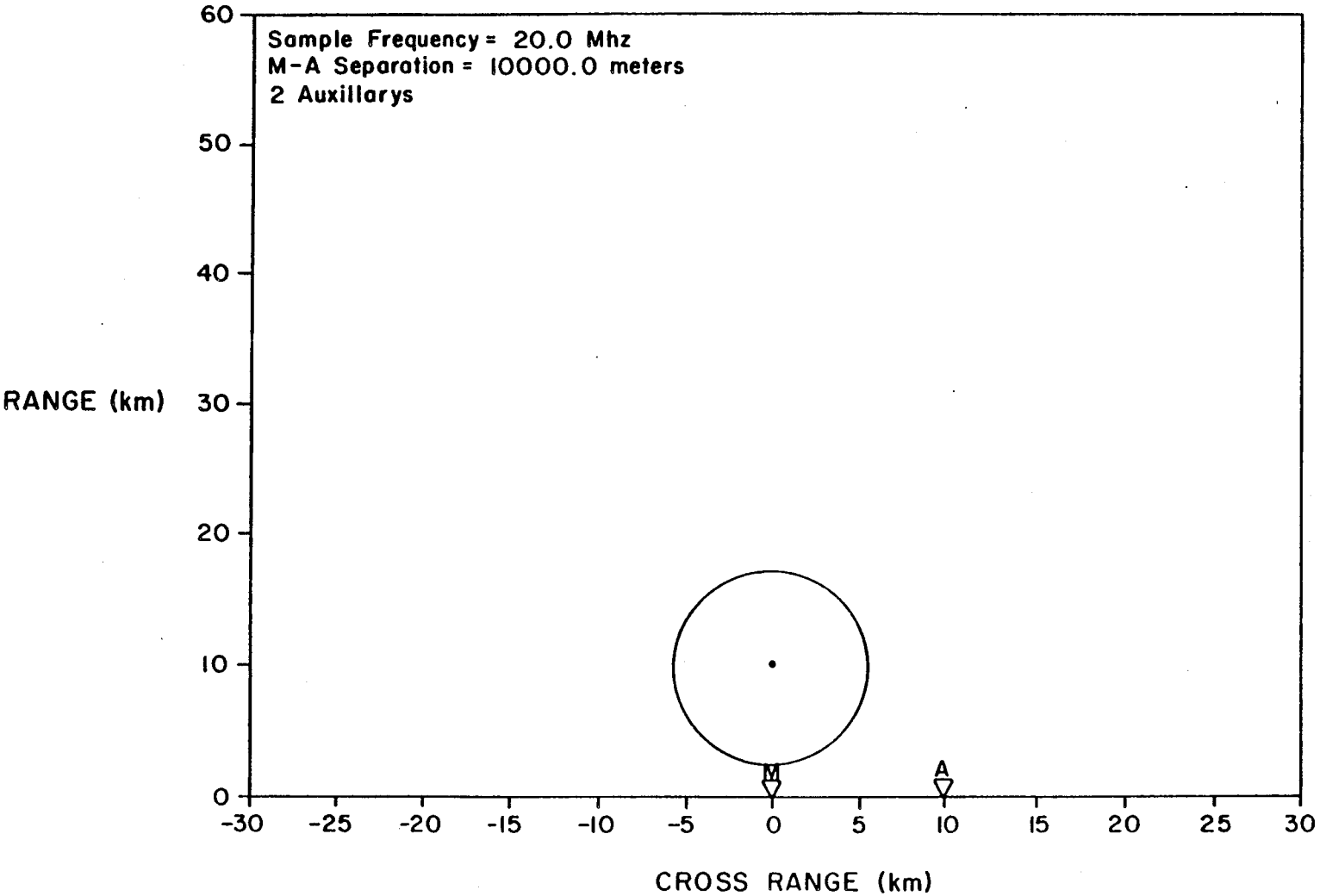
Figure 24:
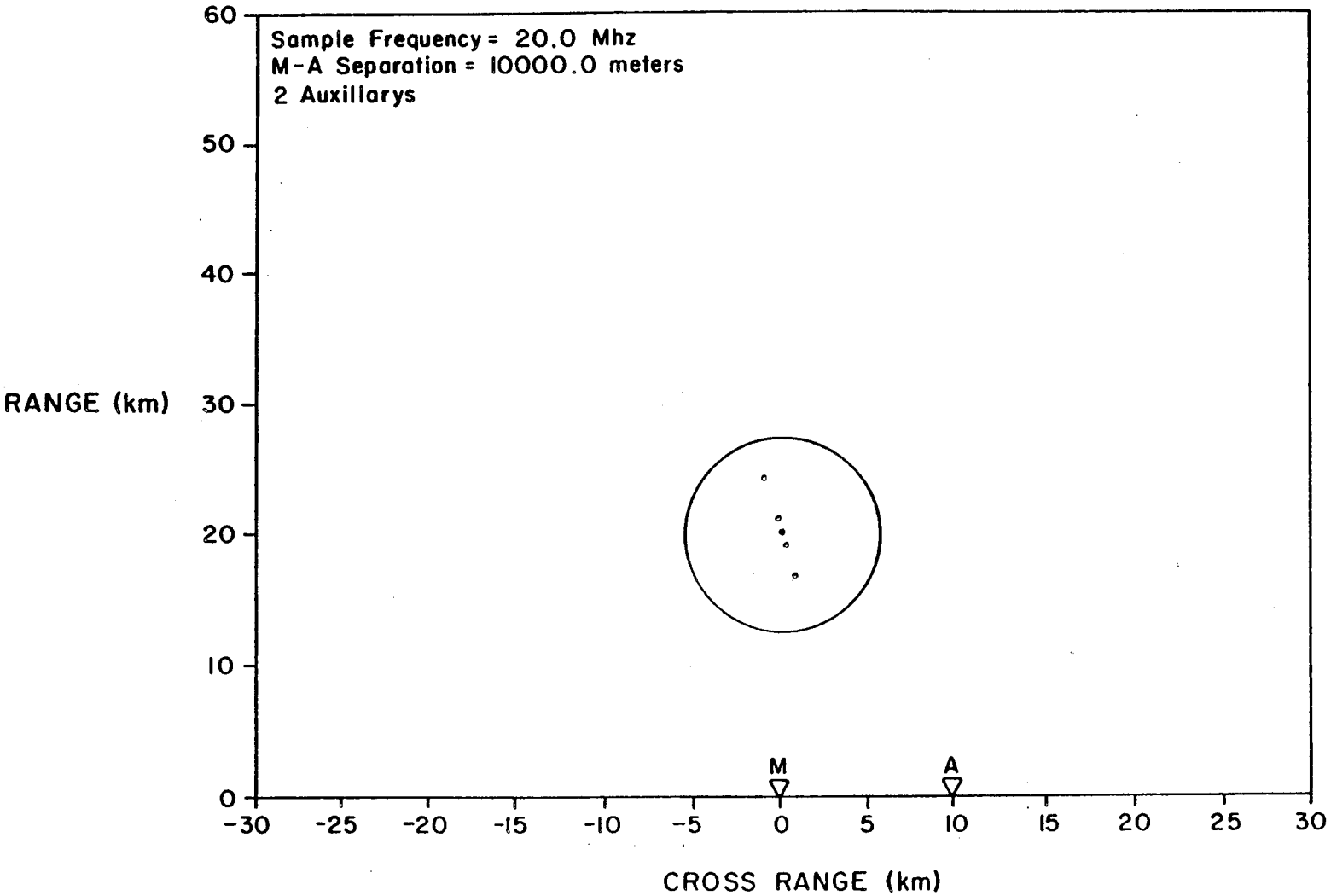
Figure 25:
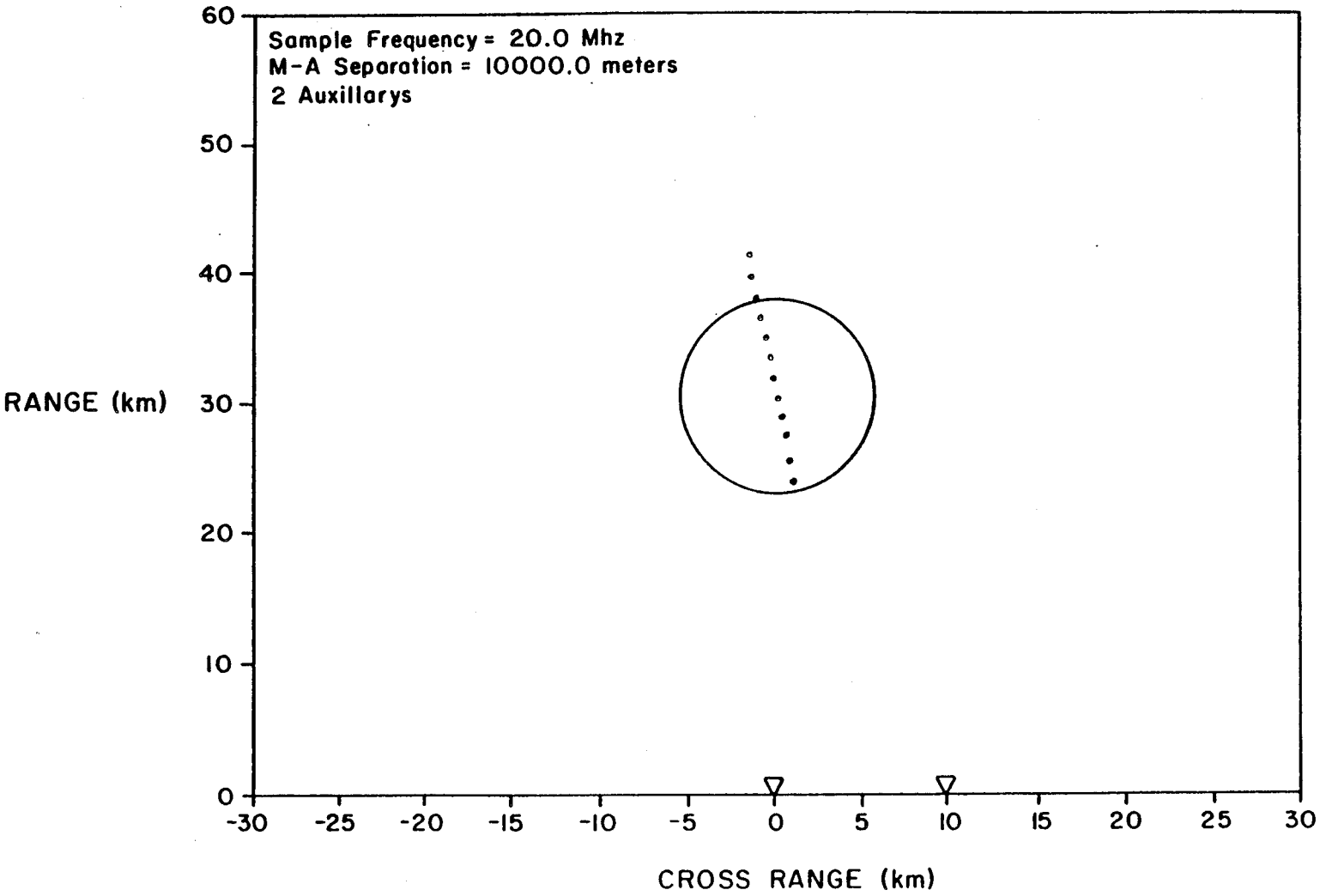
Figure 26:
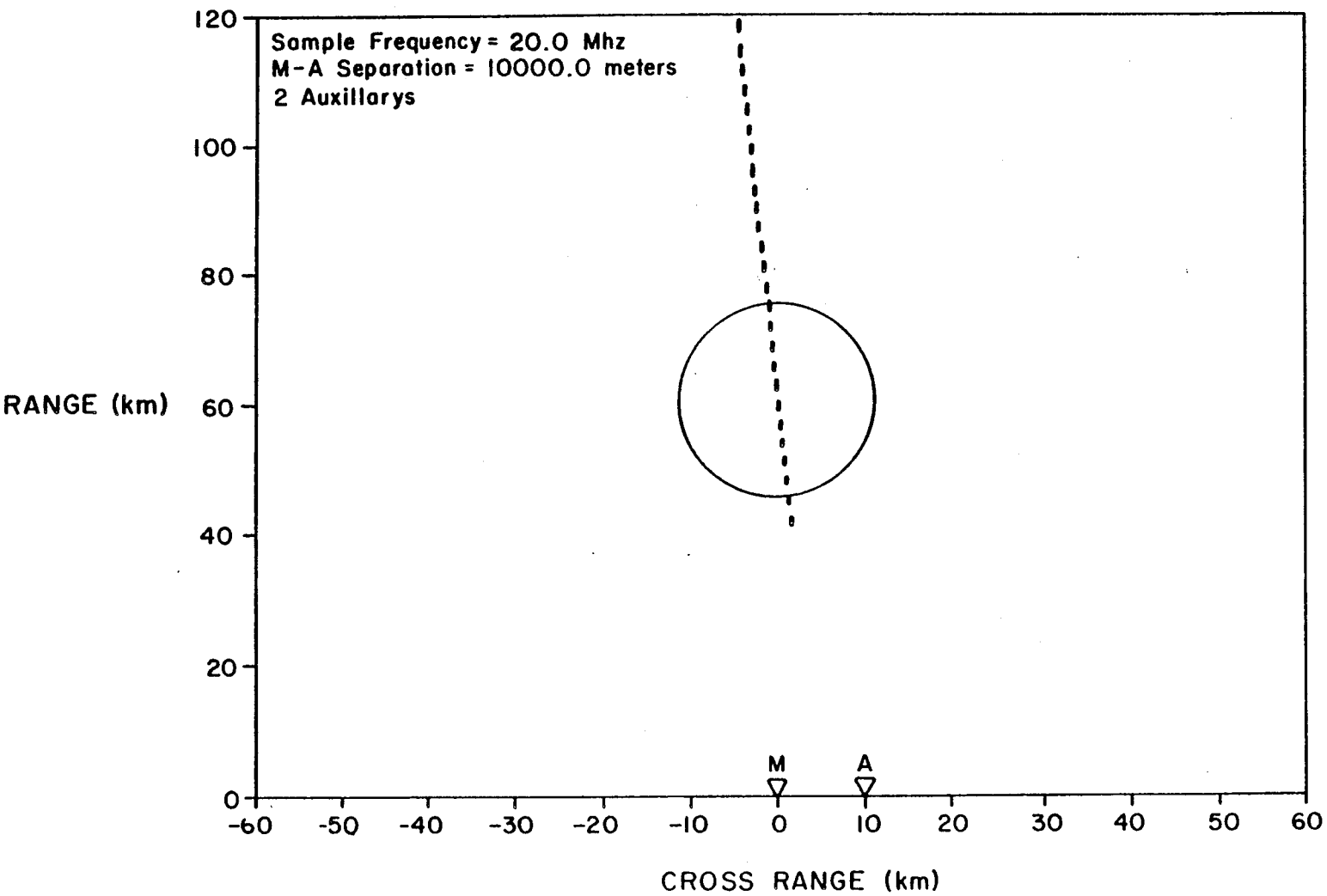
Figure 27:
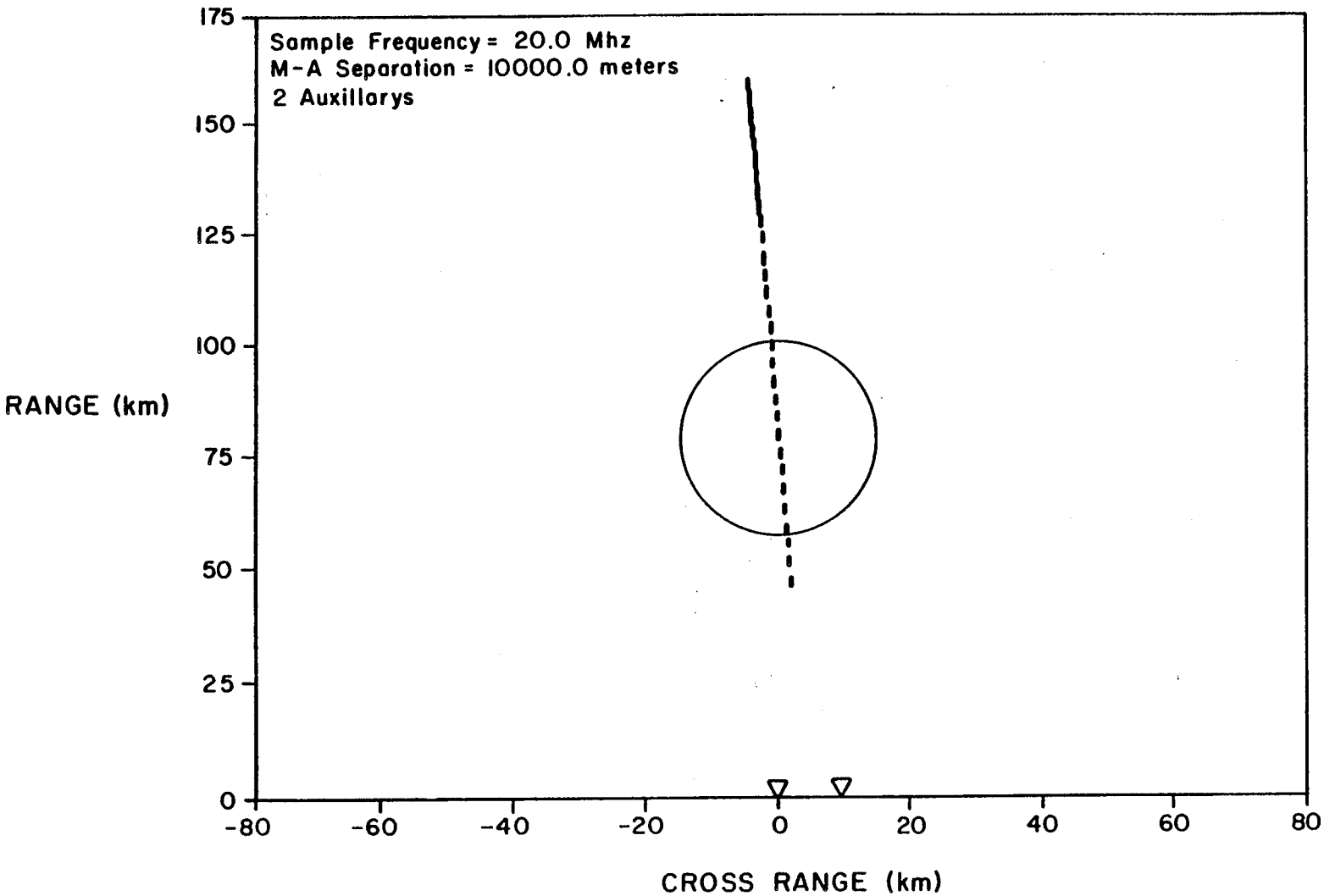

The ECCM technique of the present invention was demonstrated to be effective against stand-off jammers through examination by simulation. When the target 36 and jammer 38 are co-located (as in a self-protection jammer) then equation (1) is always violated. FIG. 5 demonstrates by simulation, the minimum main-auxiliary antenna spacing required to satisfy equation (1) and its dependence on sample frequency for a fixed target and jammer located behind it at one Km and 100 Km (line A as shown in FIG. 2). FIG. 6 demonstrates by simulation, the minimum main auxiliary antenna spacing and its dependence on range to target with jammers located behind the target at 1 Km and 100 Km for a sample frequency of 20 mHz.

It is possible to examine the region of space in which the separation criteria is violated and this occurs when equations (7) and (8) are true $$|R_M - R_{A1}| < D_R \quad (7)$$

$$|R_M - R_{A2}| < D_R \quad (8)$$

For example if the main antenna 30 and the auxiliary antenna 32 are selected, and the jammer lies along line E of FIG. 2, which is the line from the target to the bi-section of the length $D_{MA1}$, then for a large $D_R$ (low sample frequency) equation (7) is true. Curves of symmetry also exist forming ellipses around the main antenna and auxiliary antenna in question in a way which satisfies equation (7) or (8). Simulations determining when the separation criteria is violated, or "blind spot region", are shown in FIGS. 7 through 27 as darkened areas, two auxiliary antennas in accordance with the configuration of FIG. 2 having been assumed. As shown, the target for each simulation is located at the center of the circle drawn on each of the FIGS. 7 through 27. The FIGS. 7 through 27 may be divided into various functions in such a way that FIGS. 7–11 show variations in sample frequency; FIGS. 12–16 show variations in main-auxiliary antenna spacing; FIGS. 17–21 show variations in the target-main-auxiliary antenna 32 angle, and FIGS. 22–27 show variations in range to target distance. The specific variations in each of the FIGS. 7–25 may be summarized in the following table.

TABLE 1

| Figure # | Sample Frequency (Mhz) | Main-Auxiliary Spacing (meters) | Range to Target From Main (Km) | Angle Target-Main-Auxiliary (Deg) |
|---|---|---|---|---|
| 7 | 2.5 | 10,000. | 30.0 | 0.0 |
| 8 | 5.0 | 10,000. | 30.0 | 0.0 |
| 9 | 10.0 | 10,000. | 30.0 | 0.0 |
| 10 | 20.0 | 10,000. | 30.0 | 0.0 |
| 11 | 40.0 | 10,000. | 30.0 | 0.0 |
| 12 | 20.0 | 300. | 30.0 | 0.0 |
| 13 | 20.0 | 500. | 30.0 | 0.0 |
| 14 | 20.0 | 1,000. | 30.0 | 0.0 |
| 15 | 20.0 | 5,000. | 30.0 | 0.0 |
| 16 | 20.0 | 10,000. | 30.0 | 0.0 |
| 17 | 20.0 | 10,000. | 25.0 | −89.0 |
| 18 | 20.0 | 10,000. | 25.0 | −45.0 |
| 19 | 20.0 | 10,000. | 25.0 | 0.0 |
| 20 | 20.0 | 10,000. | 25.0 | 45.0 |
| 21 | 20.0 | 10,000. | 25.0 | 89.0 |
| 22 | 20.0 | 10,000. | 5.0 | 0.0 |
| 23 | 20.0 | 10,000. | 10.0 | 0.0 |
| 24 | 20.0 | 10,000. | 20.0 | 0.0 |
| 25 | 20.0 | 10,000. | 30.0 | 0.0 |
| 26 | 20.0 | 10,000. | 60.0 | 0.0 |
| 27 | 20.0 | 10,000. | 80.0 | 0.0 |

There are numerous advantages which the circuit embodying the present invention has compared to prior art methods which were discussed hereinabove in the Background section. One principal improvement is that the technique embodying the invention is able to remove the noise signal when the polarization agile noise source's bandwidth approaches that of the radar bandwidth. The ability to obtain independent estimates of the range correlated noise signal to form $W_{opt}$ without contamination with the desired signal is a function of the sample frequency, main-auxiliary antenna spacing, target-jammer separation, and range to target. As described earlier in connection with the first prior art method, the desired signal and target there may contribute to the estimate of the noise vector. Additionally, the target vector may have the same vector angle as the noise vector resulting in the removal of the desired signal. Another significant limitation of that method form is that the time constant of the Polarization Control Network (including settling time of electronic phase shifters) is typically orders of magnitude greater than the sample rate of the radar. The system of the present invention results in an improvement since the polarization agile noise source whose instantaneous bandwidth is greater than the bandwidth of the pc and control system will be removed.

Likewise, in the prior art method described hereinabove as the second example, the sample window width used to calculate the correlated signal component is still many samples at the radar's instantaneous bandwidth. Thus, given a polarization agile noise source whose instantaneous bandwidth approaches that of the victim radar would require that the adaptive canceller have a sample window width of unity. In this case, then, complete cancellation of target and noise signals will occur.

As was described hereinabove in connection with the third prior art method, that technique placed an angular null in the 3-D directional space. The technique of the present invention allows the jammer and the target to be co-located in the same angular direction, a feature which the main-lobe notcher of the prior art is not capable of doing.

In the above description of the prior art represented by the fourth method discussed, the cancellation ratio is dependent on the target scattering matrix to return non-correlated signals and for similar reasons, as discussed above in connection with the second prior art method, that is, the one which employs open-loop cancellers, the approach adopted by the prior art will fail to detect a target when the polarization agile noise source's bandwidth approaches that of the radar. The technique associated with the present invention does not have these undesirable restrictions.

It will be understood that the invention is not limited to the embodiments described above, it being apparent that those skilled in the art that various changes and modifications may be made without departing from the spirit of the invention or the scope of the appended claims.

We claim:

1. A standoff jamming ECCM system for removing a random noise source in the main lobe of a radar-transmitted beam comprising:

a main antenna for generating an electromagnetic beam for illuminating an aerial approaching target protected by a polarizer agile wideband single polarization noise jammer standing off from said target;

a first auxiliary antenna separated from said main antenna by a predetermined distance and exposed to the noise emitted by said jammer and to return signals reflected from said target;

a second auxiliary antenna separated from both said main antenna and said first auxiliary antenna by a predetermined distance and exposed to the noise emitted by said jammer and to return signals reflected from said target;

said main and auxiliary antennas being sufficiently separated from each other so as to develop a time displaced main and auxiliary code sequences at the respective outputs thereof;

means for cross correlating said main and auxiliary antenna code sequences for finding the time displacement between the time sequence of vectors measured at said main antenna and the time sequence of vectors measured at said auxiliary antennas;

means for delaying the time sequence of vectors measured at said auxiliary antennas by an amount substantially equal to the value of said time displacement;

and cancellation means for sampling the time displaced code sequence from said main antenna and the delayed time sequence from said auxiliary antennas for removing the correlated noise component from said radar.

2. The system set forth in claim 1 wherein a dual mode transducer is connected at the output of each of said antennas.

3. The system set forth in claim 1 wherein said code sequence are temporarily buffered prior to said cross-correlation.

4. The system set forth in claim 1 wherein said cross correlating means comprises a pair of cross correlators each of which has as parallel inputs the time displaced vector sequence from said main antenna and the time displaced vector sequence from a predetermined one of said auxiliary antennas.

* * * * *